(12) United States Patent
Pelton

(10) Patent No.: US 6,735,610 B1
(45) Date of Patent: May 11, 2004

(54) APPARATUS, METHODS, AND COMPUTER PROGRAM PRODUCTS FOR DETERMINING THE COEFFICIENTS OF A FUNCTION WITH DECREASED LATENCY

(76) Inventor: Walter E. Pelton, 3584 Lancelot Ct., Fremont, CA (US) 94536

( * ) Notice: Subject to any disclaimer, the term of this patent is extended or adjusted under 35 U.S.C. 154(b) by 0 days.

(21) Appl. No.: 09/560,221

(22) Filed: Apr. 28, 2000

Related U.S. Application Data

(60) Provisional application No. 60/131,656, filed on Apr. 29, 1999, provisional application No. 60/131,661, filed on Apr. 29, 1999, provisional application No. 60/131,667, filed on Apr. 29, 1999, provisional application No. 60/131,825, filed on Apr. 29, 1999, provisional application No. 60/131,858, filed on Apr. 29, 1999, and provisional application No. 60/185,346, filed on Feb. 26, 2000.

(51) Int. Cl.⁷ .............................................. G06F 17/14
(52) U.S. Cl. ........................ 708/405; 708/403; 708/404
(58) Field of Search ................................ 708/405, 404, 708/403

(56) References Cited

U.S. PATENT DOCUMENTS 3,746,848 A * 7/1973 Clary ......................... 708/404
4,023,028 A    5/1977 Dillard (List continued on next page.)

FOREIGN PATENT DOCUMENTS

| WO | WO99/63451 A1 | 12/1999 |
|----|---------------|---------|
| WO | WO00/67146 A1 | 11/2000 |

OTHER PUBLICATIONS

*Numerical Methods*, Numerical Methods, XX, XX, G. Dahlquist et al., 1974, pp. 14–19, XP002116162.

(List continued on next page.)

Primary Examiner—David H. Malzahn
(74) Attorney, Agent, or Firm—Alston & Bird LLP

(57) ABSTRACT

The present invention provides apparatus, methods, and computer program products that can decrease the latency with which the coefficients of a function representative of signal are determined. Specifically, the apparatus, methods, and computer program products of the present invention, taking advantage of the independence of samples, updates each of the coefficients of the function as each sample is received. As such, when the final sample is received, the apparatus, methods, and computer program products of the present invention need only update each coefficient with the contribution of the last sample prior to outputting the coefficients. As such, the latency from the time the last sample is received and the availability of the coefficients is decreased. To further decrease the latency, in one embodiment, the apparatus, methods, and computer program products of the present invention prestore either all or a portion of the possible values of the contribution of a sample to each coefficient, such that. As such, when the sample is received, the apparatus, methods, and computer program products of the present invention evaluate the value of the sample and retrieve the appropriate value from the prestored values that corresponds to the coefficient, sample, and value of the sample, thereby decreasing the time required to determine the coefficients. The apparatus, methods, and computer program products of the present invention also allow individual or subsets of the coefficients to be observed and also allow individual or subsets of the coefficients to be determined in varying resolutions.

30 Claims, 16 Drawing Sheets

U.S. PATENT DOCUMENTS

| | | | | |
|---|---|---|---|---|
| 4,057,756 A | * | 11/1977 | Ley et al. | 324/76.21 |
| 4,225,937 A | | 9/1980 | Perreault et al. | |
| 4,477,878 A | * | 10/1984 | Cope | 708/405 |
| 4,581,715 A | | 4/1986 | Hyatt | |
| 4,587,626 A | * | 5/1986 | Gray | 708/405 |
| 4,929,954 A | | 5/1990 | Elleaume | |
| 5,245,564 A | | 9/1993 | Quek et al. | |
| 5,515,308 A | | 5/1996 | Karp et al. | |
| 5,563,818 A | | 10/1996 | Agarwal et al. | |
| 5,784,307 A | | 7/1998 | Sheaffer | |
| 5,818,745 A | | 10/1998 | Sheaffer | |
| 6,127,863 A | | 10/2000 | Elliott | |
| 6,240,338 B1 | | 5/2001 | Peterson | |
| 6,240,433 B1 | | 5/2001 | Schmookler et al. | |
| 6,304,887 B1 | * | 10/2001 | Ju et al. | 708/404 |

OTHER PUBLICATIONS

N. Rama Murthy et al., "On the Real Time Computation of DFT and DCT Through Systolic Architectures," IEEE Transactions on Signal Processing, vol. 42, No. 4, Apr. 1994, pp. 988–991.

Blair G. M., "A Review of the Discrete Fourier Transform. Part 1: Manipulating the Powers of Two", *Electronics and Communication Engineering Journal*, Institute of Electrical Engineers, London, vol. 7, No. 4, Aug. 1, 1995, pp. 169–177.

L. R. Rabiner, B. Gold, "Theory and Application of Digital Signal Processing", 1975, Prentice–Hall, Inc., New Jersey, pp. 50–56 and 594–603.

Ersoy O.K., "A Comparative Review of Real and Complex Fourier–Related Transforms", Proceedings of the IEEE, US, IEEE, New York, vol. 82, No. 3, Mar. 1, 1994, pp. 429–447.

* cited by examiner

APPARATUS, METHODS, AND COMPUTER PROGRAM PRODUCTS FOR DETERMINING THE COEFFICIENTS OF A FUNCTION WITH DECREASED LATENCY

CROSS-REFERENCE TO RELATED APPLICATIONS

The present application claims priority from the following U.S. provisional patent applications, the contents of each of which are incorporated herein by reference: U.S. provisional patent applications Ser. No. 60/131,656 entitled EXPLOITING REDUNDANT VALUES TO PERMIT USE OF PRE-CALCULATIONS; Ser. No. 60/131,661 entitled NOVEL PARADIGM FOR EVALUATING FOURIER COEFFICIENTS; Ser. No. 60/131,667 entitled SECOND NOVEL PROCESSING CIRCUIT; Ser. No. 60,131,825 entitled FIRST NOVEL PROCESSING CIRCUIT; Ser. No. 60/131,858 entitled USING GATING WITH THE VALUE SORTING METHOD, all filed on Apr. 29, 1999, and U.S. provisional patent application Ser. No. 60/185,346 entitled METHODS AND APPARATUS FOR PROCESSING AND ANALYZING INFORMATION, filed on Feb. 26, 2000. therefor.

FIELD OF THE INVENTION

The present invention relates generally to the determination of coefficients of a function. More particularly, the apparatus, methods, and computer program products of the present invention relate to determining the coefficients of a function representative of an input signal as each sample of the signal is received to decrease latency in the determination of the coefficients.

BACKGROUND OF THE INVENTION

Signal processing is an important function of many electronic systems. In particular, in many electronic systems, data is transmitted in signal form. Further, some electronic systems analyze and monitor the operation of mechanical or chemical systems by observing the characteristics of signals, such as vibration signals and other types of signals, that are output from these systems. In light of this, methods have been developed to characterize signals such that information or data in the signal is available for data processing.

As one example, in many electronic systems, time domain signals are typically transformed to the frequency domain prior to signal processing. A typical method for converting signals to the frequency domain is performed using Fourier Transforms. The Fourier Transform of a signal is based on a plurality of samples of the time domain signal taken over a selected time period, known as the base frequency. Based on these samples of the signal the Fourier Transform provides a plurality of coefficients, where the coefficients respectively represent the amplitude of a frequency that is a multiple of the base frequency. These coefficients of the Fourier Transform, which represent the signal in the frequency domain, are then used by electronic systems in processing the signal.

Although Fourier Transforms are among some of the most widely used functions for processing signals, there are other functions that are either currently used or will be used in the future, as a better understanding of their applicability is recognized. These functions include Bessel functions, Legendre Polynomials, Tschebysheff Polynomials of First and Second Kind, Jacoby Polynomials, Generalized Laguerre Polynomials, Hermite Polynomials, Bernoulli Polynomials, Euler Polynomials, and a variety of Matrices used in Quantum Mechanics, Linear Analysis functions, wavelets and fractals just to name a few.

Although Fourier transforms and the other functions mentioned above are useful in determining characteristics of signals for use in data processing, there are some drawbacks to their use. Specifically, application of these functions to signals is typically computationally intensive. This is disadvantageous as it may require the use of specialized processors in order to perform data processing. Further, and even more importantly, the time required to perform the number of computations using these functions may cause an unacceptable delay for many data processing applications. In fact, a goal of many data processing systems is the ability to process data signals in real time, with no delay.

For example, the Fourier Series is defined as an infinite series of coefficients representing a signal. To transform a signal using a Fourier Series would require an infinite number of computations. To remedy this problem, many conventional data processing systems use Discrete Fourier Transforms (DFT), as opposed to the infinite Fourier Series. The DFT is the digital approximation to the Fourier Series and is used to process digitized analog information. Importantly, the DFT replaces the infinite series of the Fourier Series with a finite set of N evenly spaced samples taken over a finite period. The computation of the DFT therefore provides the same number of coefficients as the samples received, instead of an infinite number of samples required by the Fourier Series. As such, use of the DFT provides the most satisfactory current means to process the signal.

Because of the importance of reducing the time required to process signals, however, methods have been developed to further reduce the number of computations required to perform a DFT of a signal. Specifically, the DFT procedure computes each coefficient by a similar process. The process for a general coefficient is; multiply each sample by the sine or cosine of the normalized value of the independent variable times the angular rate and sum over all of the samples. This procedure defines N multiply-add steps for each of N coefficients, which in turn, equates to $N^2$ multiply-add computations per DFT. As many samples of a signal are typically required to perform an adequate approximation of the signal, the DFT of a signal is typically computational and time intensive.

One of the methods developed to reduce the number of computations is the butterfly method, which reduces the number of computations from $N^2$ to N times log (N). The butterfly method is based on the fact that many of the trigonometric values of the DFT are the same due to periodicity of the functions. As such, the butterfly method reduces the matrix associated with the DFT into N/2 two-point transforms (i.e., the transforms representing each coefficient $a_n$ and $b_n$). The butterfly method further reduces the redundant trigonometric values of the DFT. Although the butterfly method reduces the number of computations over the more traditional DFT method, it also adds complexity to the Fourier transformation of a signal. Specifically, the butterfly method uses a complex method for addressing the samples of the signal and the matrix containing the functions. This complexity can require the use of specialized processors and increase time for computation of the Fourier Transform. By its nature, the butterfly is a batch process, which does not begin determination of the coefficients until after all of the samples have been received. As described later, this method causes latency in the determination of the coefficients of the function.

An additional problem with the DFT, besides the number of computations required, is that the value of each coefficient of the DFT is a function of all the samples of the signal. Therefore, none of the coefficients of the DFT can be determined until all of the samples have been processed. Once the last sample of a set is received, the values of all of the coefficients can then be defined. As such, the time between the arrival of the last sample and the availability of the coefficients is referred to as the latency of the system. If the time for processing the coefficients is greater than the time to collect the set of samples, the system cannot operate in real time.

Although no coefficient is defined until all of the samples have been received, there is an advantageous property of the DFT that has not been heretofore recognized in the prior art. This property is the independence of samples. In a set of samples being transformed in a DFT process, each sample makes a contribution to each coefficient based only on the sine or cosine of the applicable angle. This is illustrated in Appendix 1. Specifically, each of the coefficients of the DFT, (i.e., A0, A1, A2, ... and B0, B1, B2, ... ), is the summation of the application of each sample to the sine and cosine functions associated with each coefficient. For example, the coefficient A1 is the summation $A1_1+A1_2+\ldots A1_8$, which are the application of each sample to the cosine function associated with the A1 coefficient. As each of the samples are related to each coefficient by addition, each sample is independent of the other samples and can be used to update the coefficients prior to receipt of the other samples.

Many conventional systems for determining the Fourier Transform of a signal do not recognize this independence of samples aspect of the DFT. Specifically, conventional systems that use the DFT typically first receive a number of samples N of a signal, and only after all of the samples have been received does the system generate each of the coefficients. As such, these conventional systems have an associated latency equal to the time required for the system to compute each of the coefficients after the last sample is received. This latency may be significant. For example, if a conventional system determines a DFT using N=64 samples, then the number of computations is $N^2$ or 4096. For the Fast Fourier Transform (FFT), this is reduced to N times log (N) or 64(6) equals 364.

Appendix 1 illustrates an example of a data processing system that waits until all of the samples have been received prior to determining the coefficients of the DFT. As can be seen, the data processing system illustrated in Appendix 1, first receives eight samples of the signal prior to beginning to process any of the coefficients of the Fourier Transform. Only after receipt of the samples does the system begin to calculate the coefficients. As latency is defined as the time between the receipt of the last sample and the time at which the coefficients are available, this data processing system has latency equal to the time required to perform all computations of the coefficients. As such, this data processing system cannot be used for real-time data processing. As real-time data processing or approximate real-time data processing is advantageous for use in many data processing systems, it would be desirous to provide apparatus and methods that decrease the time required to perform transformation of signals.

An additional problem with many conventional data processing systems, such as the butterfly, is that the coefficients of the function cannot be independently observed due to the complexity of the system. Further, because the butterfly determines the coefficients in a batch method, as opposed to real time, individual coefficients can not be observed and tracked as each new sample is received. Because, the batch method of analysis adds latency, considerable processing must be employed with conventional systems to observe and track coefficients over time. Observance and tracking individual coefficients of a signal is advantageous for in-depth signal analysis.

A still further problem with many conventional data processing systems is that these systems typically do allow for variation of the resolution of individual coefficients of the function. For example, the butterfly is configured to calculate each coefficient producing the same number coefficients as of samples. This may be disadvantageous in applications in which there is interest in only one or a subset of the coefficients, as the butterfly will spend time and resources determining coefficients of less importance to the same resolution as those coefficients of importance. In light of this, it would be desirous to provide apparatus and methods that allow for the tracking and observance of individual coefficients and also varying the resolution with which individual coefficients are calculated.

SUMMARY OF THE INVENTION

As set forth below, the apparatus, methods, and computer program products of the present invention overcome many of the deficiencies identified with processing signals using functions, such as Fourier Transforms. In particular, the present invention provides apparatus, methods, and computer program products that determine the coefficients of a function representative of an input signal with reduced latency, such that the coefficients of the function are made available within a decreased time from receipt of the last sample of the signal. The present invention also provides apparatus, methods, and computer program products that reduce the amount of data that must stored in order to determine the coefficients of a function, such that less complex hardware designs can be implemented. Further, the present invention provides apparatus, methods, and computer program products that allow individual coefficients to be tracked and observed and also allows individual coefficients or subsets of coefficients to be determined with differing levels of resolution.

Specifically, in one embodiment, the present invention provides apparatus, methods, and computer program products that update at least one of the coefficients of a function prior to receipt of the last sample of the signal, such that the coefficients of the function may be determined with reduced latency. Further, in another embodiment, the apparatus, methods, and computer program products of the present invention update each of the coefficients of a function as each of the samples of the signal are received. As discussed previously, each of the samples of the signal affects the coefficients of the function independently of the other samples. The independent nature of the samples permits the equations for each coefficient to be rearranged so as to group all of the contributions from each sample separately. The result is that the contributions of each sample can be computed when the sample is received and then added to each coefficient.

In light of this, in one embodiment, the present invention includes an apparatus for determining the coefficients of a function representative of an input signal based on a predetermined plurality of samples of the input signal. The apparatus of the present invention includes a coefficient generator that receives each of the samples one at a time and updates at least one of the coefficients of the function prior to receipt of the last sample.

In another embodiment, the apparatus of the present invention includes a coefficient generator that receives each of the samples one at a time and updates the coefficients of the function based on each sample as the sample is received without awaiting receipt of all samples. The coefficients are thus updated each time before the arrival of the next sample. As such, when the last sample is received, the only remaining computations are the determination of the contribution of the last sample to each coefficient. Therefore, the latency from receipt of the last sample until the coefficients are available is reduced.

In a further embodiment of the present invention, the coefficient generator simultaneously updates each of the coefficients with a sample as it is received. As such, when the final sample is received, the coefficient generator simultaneously updates each of the coefficients and the latency between receipt of last sample and the availability of the coefficients is significantly reduced.

In addition to decreasing the latency between receipt of the last sample and availability of the coefficients, the apparatus, methods, and computer program products of the present invention also reduce hardware needed for implementation. Specifically, as discussed the apparatus, methods, and computer program products of the present invention update each of the coefficients with the contribution of each sample as the sample is received. As such, retaining the sample after each of the coefficients has been updated is not required, thereby reducing the amount of storage.

Further, the apparatus, methods, and computer program products of the present invention also decrease the time for performing computations by precalculating at least a portion of the functions associated with each coefficient and storing these pre-calculated values in memory for use in determining the coefficients for a given signal. Specifically, as discussed above and illustrated in Appendix 1, each of the samples is related to each of the coefficients by a trigonometric function, where the value of the trigonometric function is based on the coefficient and the order that the sample was received in the plurality of samples. As the coefficient and the order in which the sample is received are known before hand, the apparatus, methods, and computer program products of the present invention pre-calculate this portion of the trigonometric function for each sample and coefficient. As such, when each sample is received, the coefficient generator of the present invention need only multiply the sample by the pre-calculated value associated with the sample and coefficient.

Specifically, in one embodiment, the present invention includes an apparatus having a coefficient generator that includes a memory device. Stored in the memory device are pre-calculated values representing the mathematical function associated with each sample and coefficient. In this embodiment of the present invention, when a sample is received, the coefficient generator accesses the memory device and multiplies the sample by the value representing the mathematical function associated with the sample and coefficient to thereby define a term of the coefficient. The coefficient generator further updates the coefficient by adding the term to the previous value of the coefficient.

In an additional embodiment, the apparatus, methods, and computer program products may store each of the pre-calculated values in a memory device that includes an array having a plurality of cells, where each cell of the array stores a value representing the mathematical function associated with a respective sample and coefficient. Further, in this embodiment, each cell of the array has a unique address, which is designated by the respective coefficient and sample. As such, for each sample and coefficient, the coefficient generator of this embodiment of the present invention accesses the cell of the memory device using the address associated with the sample and coefficient, multiplies the sample by the stored value to thereby define a term of the coefficient, and thereafter updates the coefficient by adding the term to the previous value of the coefficient.

In addition to reducing the required number of calculations by precalculating the function associated with each sample and coefficient, in one embodiment, the apparatus, method, and computer program product of the present invention also pre-calculates all the possible values of the magnitude of the sample with the trigonometric function associated with each coefficient and sample. As such, when a sample is received, the coefficient generator need only evaluate the value of the sample and retrieve the pre-calculated value associated with the value of the sample and the mathematical function for the sample and coefficient from the memory device and use the pre-calculated value to update the coefficient.

For example, in one embodiment, the present invention includes an apparatus having a coefficient generator with first and second memory devices. The first memory device includes an array of cells with each cell associated with a respective sample and coefficient. Each cell contains a pre-calculated value corresponding to the combination of one of the finite number of possible values of the sample and the mathematical function associated with the respective coefficient and sample. The second memory device also has an array of cells for storing tokens. Each of the tokens represents a respective coefficient and sample.

In operation, when a sample is received, the coefficient generator accesses the second memory device and for each coefficient retrieves the token associated with the coefficient and the sample and supplies the token to the first memory device. Further, the coefficient generator receives the value of the sample and based on the token from the second memory device and the value of the sample, retrieves the pre-calculated value stored in the cell of the first memory device that has an address comprised of the token and the value of the sample. The coefficient generator further updates the coefficient by adding the pre-calculated value from the first memory device to the previous value of the coefficient.

In another embodiment, the coefficient generator includes a multiplier, adder, divider, or other gated functions, rather than a second storage device. In this embodiment, the tokens are provided by the gate to the first memory device for addressing the cells of the first memory device. In still another embodiment, a counter is decoded with or without the use of gates into tokens for addressing the second memory device, which may be conversion into values that feed a multiplier, adder, divider or other gated function, rather than a memory device.

In addition to reducing the time for calculating the coefficient based on each sample by storing pre-calculated values, the present invention also provides apparatus, methods, and computer program products that minimizes the number of values that must be stored in the memory device and the size of the token needed to address the first memory device. Specifically, due to the trigonometric nature of some functions, some of the coefficients for some samples will have a mathematical value of zero. As the trigonometric function is dependent on the coefficient and sample number, these instances can be predetermined. Further, because the value for these instance is zero, there is no need to provide storage for these values in the first memory device, thereby reducing the size of the array of the memory device and the size of the token needed to address the first storage device.

Specifically, in this embodiment of the present invention, the token also indicates if the value of the mathematical function associated with the respective sample and coefficient is zero. When a sample is received for which the trigonometric function for the sample and a coefficient is zero, the token associated with the sample and coefficient will so indicate. As such, when the coefficient generator accesses the token associated with the sample and coefficient, the coefficient generator will observe the token and update the coefficient by adding a zero to the previous value of the coefficient.

In some embodiments, the coefficient generator further includes a null device, such as a pull down circuit. In this embodiment, if the token indicates that the mathematical function is zero, the null device replaces the output of the first memory device with a zero value for addition to the coefficient.

To further minimize storage, in one embodiment, the present invention provides apparatus, methods, and computer program products that stores only pre-calculated values corresponding to the combination of a respective sample and the magnitude of a respective mathematical function, without accounting for the sign of the mathematical function. Specifically, due to the periodic nature of some functions, some of the mathematical functions associated with the respective sample and coefficients have the same magnitude, but different signs. In this embodiment, of the present invention, only the magnitude of each value is stored in the memory device. Further, the sign of the value is indicated in the token. As such, less storage is needed for the values.

In one embodiment of the present invention, the coefficient generator further includes an adder in electrical connection with the output of the first memory device. If the token indicates that the mathematical function is negative, the adder using twos-complement takes the negative of the magnitude of the mathematical function output by the first memory device.

As detailed above, the present invention determines the coefficients of the function representative of signal by combining each sample upon receipt with the mathematical function associated with the sample and the coefficient. Further, as detailed above, the different combinations of the samples and coefficients are pre-calculated and stored in an addressable memory device. Typically, the tokens that address the cells of the memory device have bits indicating the coefficient and bits indicating the sample. While in the normal operation, the tokens and memory device are used to determine the coefficients of a function that is representative of a signal; these tokens and memory device may also be used to determine the coefficients of an inverse function of a signal. Specifically, in one embodiment, the coefficient generator further includes a selector in electrical connection with either the gate, counter, second memory device used to generate the tokens for addressing the first memory device. If the coefficients for an inverse function of a signal are desired, the selector alters the address indicated by the token such that the token addresses a cell of the first memory device containing a pre-calculated value representing an inverse mathematical function of the signal.

As detailed above, the present invention determines the coefficients of the function representative of signal by combining each sample upon receipt with the mathematical function associated with the sample and the coefficient. Further, as detailed above, the different combinations of the samples and coefficients may be pre-calculated and stored in an addressable memory device or may be computed by a gated function with reference to a value associated with the token. Typically, the tokens that address the cells of the memory device are derived from state information obtained from the counter indicating the coefficient and the sample. While in the normal operation, the tokens and memory device are used to determine the coefficients of a function that is representative of a signal, these tokens and memory devices may also be used repetitively by adding bits to the counter at appropriate locations and thus service a multiplicity of channels. In this embodiment, additional coefficient memory cells maintain the additional coefficients, and a channel number may be output as a convenience to the user. It is still possible employ an electrical signal to determine the forward coefficients or to determine the inverse function of the input.

Further, while in the normal operation, the tokens and memory device are used to determine the coefficients of a function that is representative of a signal, these tokens and memory devices may also be used repetitively by adding bits to the counter at appropriate locations and thus service a multiplicity of channels. In this embodiment, additional coefficient memory cells maintain the additional coefficients, and a channel number may be output as a convenience to the user. By letting consecutive samples be treated as different channels it is possible to thus produce interleaved transforms. The interleaved transforms may be sent to a second similar process to produce two-dimensional transforms, as one example.

In a further embodiment, the coefficient generator receives samples from a plurality of different signals on different channels. In this embodiment, the coefficient generator, via the selector, may provide the coefficients of a function representative of one signal, while also providing the coefficients of an inverse function of another signal.

As detailed above, the apparatus, methods, and computer program products of the present invention process a plurality of samples and generate the coefficients of the function based on the samples. In some embodiments of the present invention, after the plurality of samples have been received, the apparatus, methods, and computer program products of the present invention output the generated coefficients, reset the coefficients, and again take samples of the signal. In some embodiments, however, it may be advantageous to generate and output a complete set of coefficients as each new sample is received and processed. This is referred to as a Sliding Aperture Fourier Transform (SAFT).

In this embodiment, the apparatus, methods, and computer program products of the present invention do not reset each of the coefficients to zero after the final sample of a plurality of samples has been received and the coefficients have been output. Instead, the apparatus, methods, and computer program products of the present invention replace the first sample of the previous plurality of samples with the next received sample. Using this new sample, the apparatus, methods, and computer program products of the present invention output a next set of coefficients. As such, instead of generating a set of coefficients for each "batch" of samples, the apparatus, methods, and computer program products of the present invention generates a set of coefficients each time a new sample is received, thereby providing new set of coefficients for each time a new sample is received.

The present invention provides several apparatus, methods, and computer program products for generating a set of coefficients each time a new sample is received. In each of these embodiments, the apparatus, methods, and computer program products of the present invention replace the first sample of the previous plurality of samples with the next sample received and then outputs the new coefficients. For example, in one embodiment, the apparatus, methods, and computer program products of the present invention initially store each of the samples as they are received and generates a first set of coefficients when the last sample of the plurality of samples has been received. Further, when a new sample of the input signal is received, after the predetermined plurality of samples has already been received, the apparatus, methods, and computer program products of the present invention apply the mathematical function associated with the coefficients to the sample and generate a term based on the new sample for each coefficient. To replace the new sample with the first sample of the plurality of the samples, the generated term of the new sample is subtracted from the term associated with the first sample of the predetermined plurality of samples that was previously stored in the memory device. Following this subtraction, the coefficients are updated by the difference between the terms based upon the new sample and the first sample of the predetermined plurality of samples.

In another embodiment of the present invention, to replace the new sample with the first sample of the plurality of samples, the apparatus, method, and computer program products of the present invention subtract the term based upon a first sample of the predetermined plurality of samples from each of the coefficients and adds the term based upon the new sample to each of the coefficients.

In addition to outputting coefficients for each new sample received, the apparatus, methods, and computer program products of the present invention also allow individual of subsets of coefficients to be observed and tracked over time. Specifically, as stated above, the coefficient generator of one embodiment outputs coefficients for each new sample. This provides a user with a new set of coefficients in real or near real-time for observance.

Further, as discussed, the apparatus, methods, and computer program products of the present invention update each of the coefficients of the function as each sample is received. As the coefficients are individually updated, they are more readily individually available for observance. Further, because each coefficient is updated individually, the number of updates made to each individual coefficient may be varied. As such, in one embodiment, the apparatus, methods, and computer program products of the present invention can vary the resolution to which either one or a subset of coefficients are determined by varying the number of samples by which they are updated relative to the other coefficients.

In addition, the present invention also provides methods and computer program products for reducing the number of values that must be stored to represent the possible mathematical terms of a function. Specifically, as illustrated above, time for performing computations can be conserved by precalculating and storing either portions of or all values associated with a system. However, it is often desirable to reduce the amount values that require storage to a minimum, such that standard memory devices may be used.

In one embodiment, the present invention provides methods and computer program products that initially generate a first list of all possible mathematical terms of the function. For each mathematical term, the method and computer program product systematically compare each mathematical term in the list to all other mathematical terms in the list to determine which of the mathematical terms are redundant. Further, the unique mathematical terms of the function are stored in a second list all of the unique mathematical terms of the function, such that there are no redundant mathematical terms of the function in the second list.

In one embodiment of the present invention, the function is at least periodic or reversing such that some of the mathematical terms of the function have the same magnitude and different signs. In this embodiment, the method and computer program product of the present invention compare the magnitude of each mathematical term in the list to the magnitude of each of the other mathematical terms in the list to determine which of the mathematical terms have the same magnitude. Further, the mathematical terms having unique magnitudes are stored in the second list. The method and computer program product of the present invention further includes creating a token associated with each mathematical term, where the token indicates the magnitude stored in the second list associated with the mathematical term and the sign associated with the mathematical term.

In another embodiment of the present invention, at least one of the mathematical terms has a magnitude of zero. In this embodiment, the method and computer program product create a token associated with the mathematical term indicating that the mathematical term is zero such that the mathematical term is not stored in the second list.

In another embodiment, the function is representative of a signal and is defined by samples of the signal, where a sample of the signal is one of a finite number of possible values. In this embodiment, the method and computer program product generate the first list of all possible combinations of the possible values of the sample and the mathematical terms of the function. Further, each combination in the list is systematically compared to all other combinations in the list to determine which of the combinations are redundant. Based on this comparison, all of the unique combinations are stored in the second list, such that there are no redundant combinations in the second list.

DETAILED DESCRIPTION OF THE INVENTION

Figure 1:
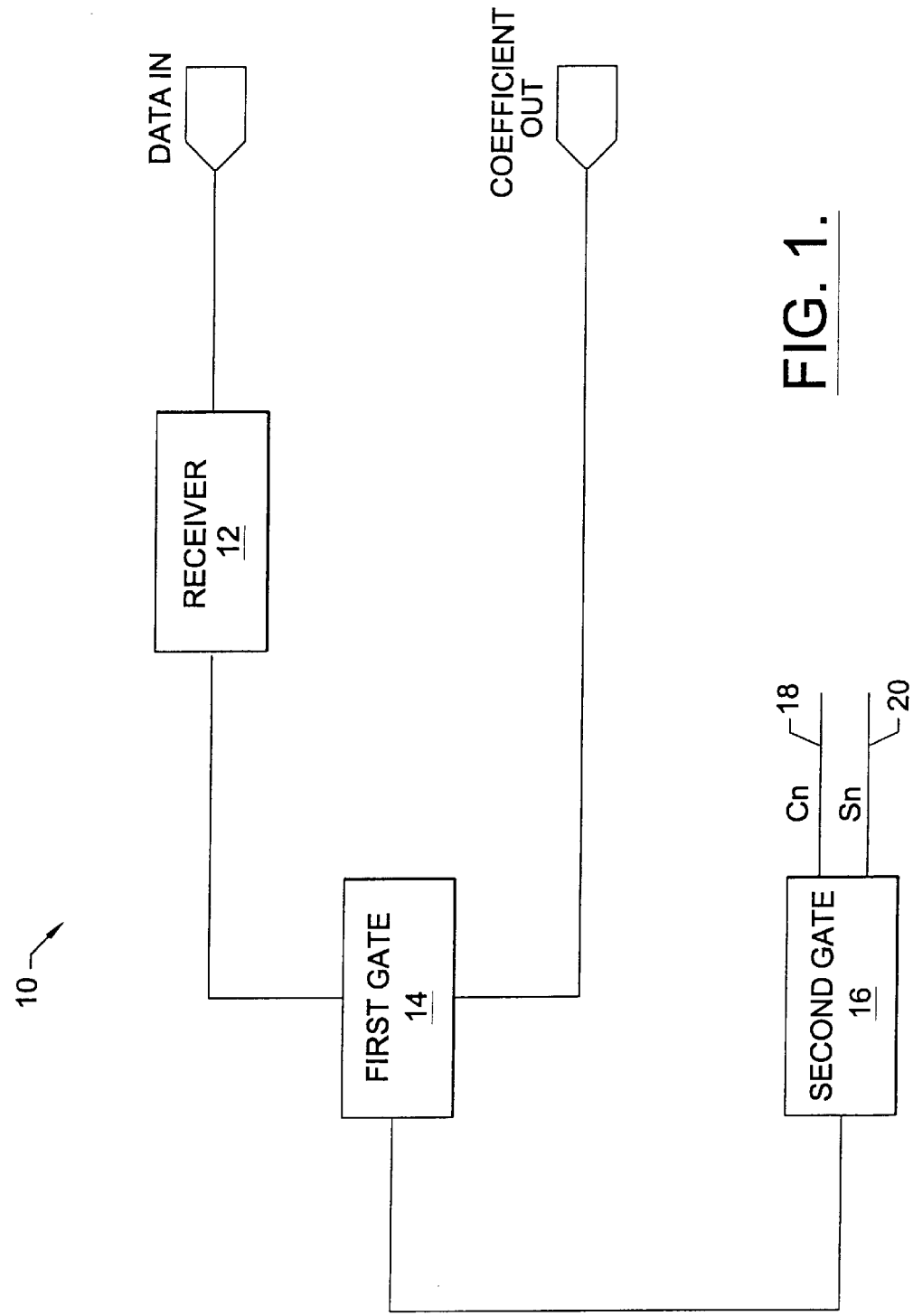
FIG. 1 is a block diagram of an apparatus for determining the coefficients of a function representative of an input signal based on a sample of the input signal using gate devices according to one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed above, data processing systems have been developed for determining the coefficients of a function that is representative of a signal. However, because many of these systems are complex and do not calculate the coefficients until all samples of the signal have been received, these systems do not provide immediate analysis of the signal. Further, because these conventional systems are complex, the individual coefficients are not readily accessible for observance and tracking. Further, these systems do not allow variation in the resolution of individual or selected subsets of coefficients.

The present invention, on the other hand, provides apparatus, methods, and computer program products that can decrease the latency with which the coefficients of a function representative of signal are determined. Specifically, the apparatus, methods, and computer program products of the present invention, taking advantage of the independence of samples, updates at least one of the coefficients prior to receipt of the last sample, such that the latency in determining the coefficients is reduced.

Further, in another embodiment, the apparatus, methods, and computer program products of the present invention update each of the coefficients of the function as each sample is received. As such, when the final sample is received, the apparatus, methods, and computer program products of the present invention need only update each coefficient with the contribution of the last sample prior to outputting the coefficients. As such, the latency from the time the last sample is received and the availability of the coefficients is decreased.

To further decrease the latency, in one embodiment, the apparatus, methods, and computer program products of the present invention prestore either all or a portion of the possible values of the contribution of a sample to each coefficient. As such, when the sample is received, and especially the last sample, the apparatus, methods, and computer program products of the present invention evaluate the value of the sample and retrieve the appropriate value from the prestored values that corresponds to the coefficient, sample, and value of the sample, thereby decreasing the time required to determine the coefficients. Still further, in another embodiment, the apparatus, methods, and computer program products of the present invention update each of the coefficients simultaneously. As such, when the last sample is received, the coefficients are updated simultaneously with the contribution of the last sample, and all of the coefficients are output.

The apparatus, methods, and computer program products of the present invention also allow individual or subsets of the coefficients to be observed and also allows individual or subsets of the coefficients to be determined in varying resolutions. Specifically, as stated, the apparatus, methods, and computer program products of the present invention update each of the coefficients as each sample is received. As such, each sample is available for output when desired. Further, because the apparatus, methods, and computer program products of the present invention update each coefficient independent of the other coefficients, each coefficient can be updated to different resolutions. For example, one coefficient of interest may be updated with every sample, while another coefficient is only updated with every third sample.

The apparatus, methods, and computer program products of the present invention may also reduce the amount and size of hardware needed to implement the processing system. Specifically, as stated, when a sample of the signal is received, the apparatus, methods, and computer program products of the present invention immediately update each of the coefficients with the contribution of the sample. As the samples are independent of each other, the sample is no longer needed after the coefficients have been updated with its contribution, and as such, the sample may be discarded. By discarding the sample after use, the processing system does not require additional memory storage for storing the samples or additional processing for retrieving the data.

The present invention also provides methods and computer program products for reducing the number of values that must be stored to represent the possible mathematical terms of a function. Specifically, the method and computer program product of this embodiment of the present invention compares each of the possible mathematical terms of a function to the other mathematical terms. From this comparison, the method and computer program products reduce the number of values that should be stored. For example, in one embodiment, the mathematical function may be periodic, such that different values of the function have the same magnitude, but different signs. In this instance, the method and computer program product of the present invention would only store the magnitude of the terms and use a token to represent the sign. In another embodiment, there may be values of the function that are zero, (e.g., $\cos(\pi/2)$ and $\sin \pi=0$). In this embodiment, the method and computer program products do not store the value of zero, but instead use a token representing that the value is zero.

For illustrative purposes, the various apparatus, methods, and computer program products of the present invention are illustrated and described below in conjunction with the characteristics of Fourier Series. It should be apparent, however, that the apparatus, methods, and computer program products of the present invention can be used with many different types of functions. For instance, the apparatus, methods, and computer program products may be used with functions such as Bessel functions, Legendre Polynomials, Tschebysheff Polynomials of First and Second Kind, Jacoby Polynomials, Generalized Laguerre Polynomials, Hermite Polynomials, Bernoulli Polynomials, Euler Polynomials, and a variety of Matrices used in Quantum Mechanics, Linear Analysis functions, wavelets and fractals. This list is by no means exhaustive and is provided as mere examples. The approach may be applied to any function that can be expressed as a sequence of values. The usefulness of the application of these and other functions not listed above is quite general. This method provides a way to develop apparatus and methods for parallel computing and remove redundancy in a rote manner, which is compatible with machine execution. One implementation of the present invention would be in a general purpose computer program to examine each class of problem an write a minimal execution program or design an apparatus for the same function. In this application, it would be a programming aid.

As discussed above with reference to Appendix 1, an important concept of the present invention is the independence of the samples used to determine the coefficients of a function. The independence of samples can be illustrated in the context of Fourier Transforms. The Fourier Transform is based on the principle of orthogonality. As a Fourier Transform is applied in the DFT, it provides a means to evaluate the amplitude of the components of each frequency of a signal totally independently. The frequencies used in the computation are consecutive integral multiples of the base frequency. The base frequency is the time period required to take one set of samples. The samples of the signal are multiplied by each member of the set of orthogonal functions and summed for one or a plurality of cycles of the base frequency. Each resulting coefficient is the amplitude of the real or imaginary part of one test frequency. Importantly, the computation of a coefficient is independent of the computation of the other coefficients. In a set of samples N, that are transformed by the DFT, each sample contributes to each coefficient of the function based on either the sine or cosine of the applicable angle and normalization constants. The general equations for a Discrete Fourier Transform are provided below:

$$n := 0, 1 \ldots \infty \quad a_n := \frac{1}{L} \cdot \int_{-L}^{L} f(x) \cdot \cos\left(\frac{n \cdot \pi \cdot x}{L}\right) dx$$

$$n := 1, 2 \ldots \infty \quad b_n := \frac{1}{L} \cdot \int_{-L}^{L} f(x) \cdot \sin\left(\frac{n \cdot \pi \cdot x}{L}\right) dx$$

$$f(x) := \frac{a_0}{2} + \left[\sum_{n=-\infty}^{\infty} \left(a_n \cdot \cos\left(\frac{n \cdot \pi \cdot x}{L}\right) + b_n \cdot \sin\left(\frac{n \cdot \pi \cdot x}{L}\right)\right)\right]$$

With reference to Appendix 1, the determination of the coefficients of a function using conventional DFT is illustrated. Initially, the DFT receives a preselected set of samples of a signal, (in this example N=8). The DFT next calculates all of the coefficients, ($A_0, A_1, A_2, A_3, A_4, B_1, B_2, B_3$, and $B_4$) one at a time. The value of each sample is used one time in the computation of the coefficients. Each sample is multiplied by both the sine and cosine of the independent variable associated with each coefficient times a normalized rate. For example, the coefficient A1 is the summation $A1_1+A1_2+\ldots A1_8$, which are the application of each sample to the cosine function associated with the A1 coefficient. As each of the samples are related to each coefficient by addition, each sample is independent of the other samples and can be used to update the coefficients prior to receipt of the other samples.

In light of this independence of samples, the apparatus, methods, and computer program products of the present invention rearrange the terms as shown in Appendix 2, such that each of the coefficients are updated as each of the samples of the signal are received. This is different from the conventional method of Appendix 1, which is a batch method that awaits until all samples have been received before calculating the coefficients. As described above and detailed below, by updating each of the coefficients as each sample is received, the apparatus, methods, and computer program products of the present invention can reduce latency in generation of the coefficients, allow individual coefficients to be tracked or observed, and determine the coefficients with different resolutions.

With reference now to FIG. 1, one embodiment for determining the coefficients of a function representative of an input signal based on samples of the input signal, according to the method illustrated in Appendix 2, is shown. The apparatus of this embodiment of the present invention includes a coefficient generator 10. The coefficient generator includes a receiver 12 for receiving samples of an input signal. The coefficient generator also includes a first gate 14 in electrical communication with the receiver and a second gate 16 in electrical communication with the first gate.

Figure 2:
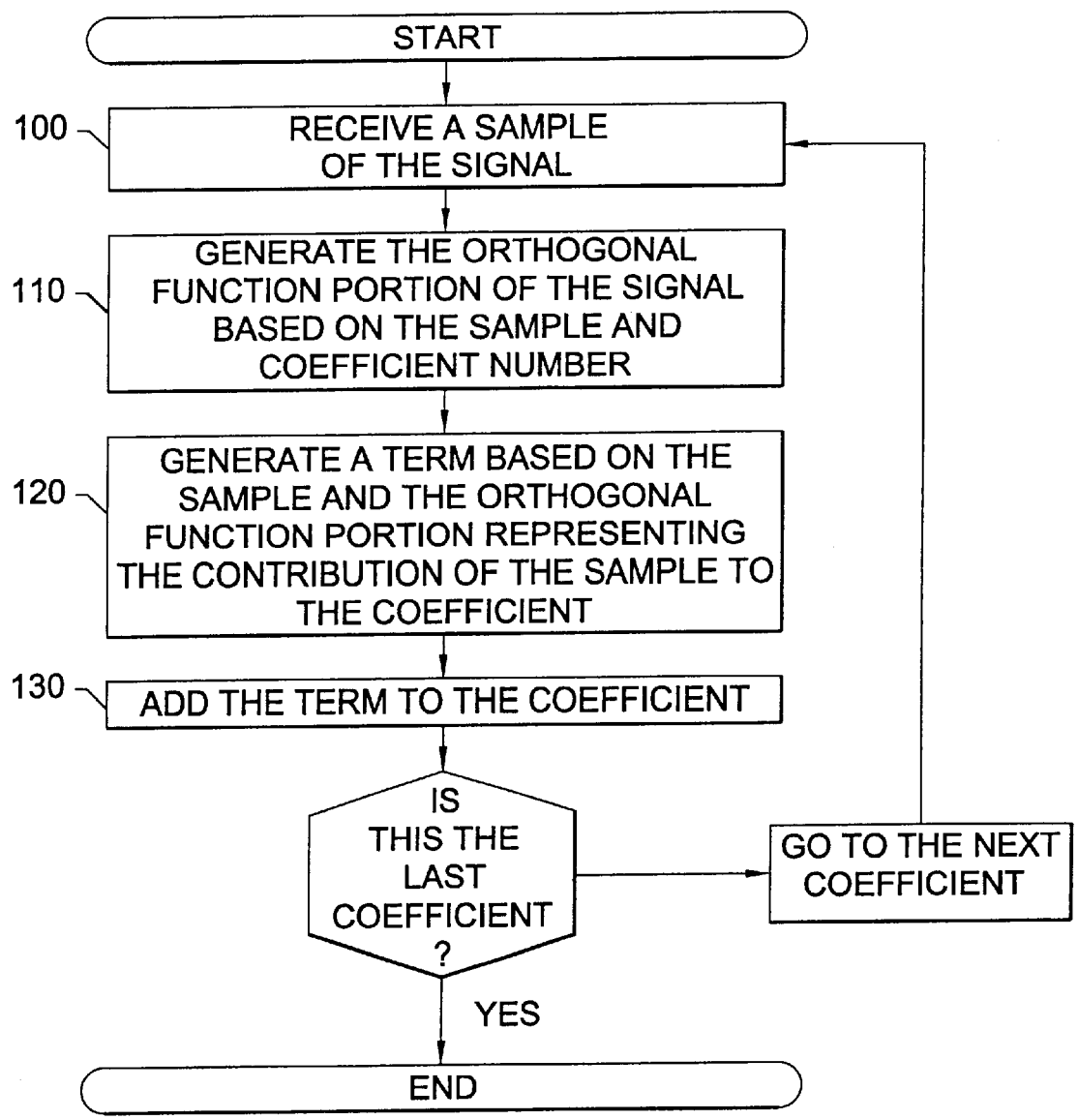
FIG. 2 is a block diagram of the operations performed to determine the coefficients of a function representative of an input signal based on a sample of the input signal according to one embodiment of the present invention.

With reference to FIG. 2 and Appendix 2, the operation of the coefficient generator is illustrated. In this illustration, the coefficient generators generates the coefficients based on N=8 samples of the signal. For each sample, the receiver receives a sample of the signal and inputs the sample to the first gate 12. (See step 100). For each coefficient, the second gate receives two values, one 18 representing the number of the coefficient and the other 20 representing the sample number. Based on the coefficient number and the sample number, the second gate generates the orthogonal function portion of the signal. (See step 110).

For example, as shown in Appendix 2, for the zeroth coefficient A0, the sample value is added to the coefficient, (i.e., A0+A0$_1$). For the first sample and coefficient A1$_1$, the orthogonal function is:

$$\cos(2\pi C_n S_n/N)$$

where:

C$_n$=coefficient number;

S$_n$=sample number; and

N=number of samples.

To calculate the term for the first coefficient and first sample, the second gate receives the coefficient number 18 and the sample number 20. Based on this, for the first sample S$_n$ and the first coefficient C$_n$, the second gate generates cos (2π·1·⅛) or cos(2π/8) and outputs this value to the first gate. (See step 110).

The first gate, in turn, receives the value from the second gate and the value of the sample from the receiver. Based on these values, the first gate generates a term representing the contribution of the sample to the coefficient, (i.e., S$_1$ cos (2π/8)). (See step 120). This term is then added to the coefficient A1, (i.e., A1+A1$_1$). (See step 130). This is repeated for each coefficient. (See steps 140 and 150).

The discussion above illustrates the updating of each coefficient one at a time with each sample. However, it must be understood that the coefficient generator could only update one of the coefficients prior to receipt of the last coefficient and thereby decrease the latency in determining the coefficients. Further, it must be understood that the coefficient generator could update all of the coefficients with each sample simultaneously. For example, the coefficient generator could contain a plurality of first and second gates all connected to the receiver. In this embodiment, the sample is supplied to each set of gates simultaneously, and each set of gates, in turn, generates the term for each coefficient representing to the contribution of the sample to each coefficient simultaneously, and each coefficient is updated simultaneously. This is referred to as parallelism and is advantageous as it allows all coefficients to be updated simultaneously. Parallelism is the typical application of the coefficient generator. Specifically, the coefficient generator is typically implemented to update all coefficients simultaneously. Further, in some instance, the coefficient generator is configured to received inputs from several channels, for which the coefficient generator generates a set of coefficients for each channel. However, in many of the embodiments below, the coefficient generator is illustrated as updating each coefficient sequentially and with only one channel for sake of clarity.

Figure 3:
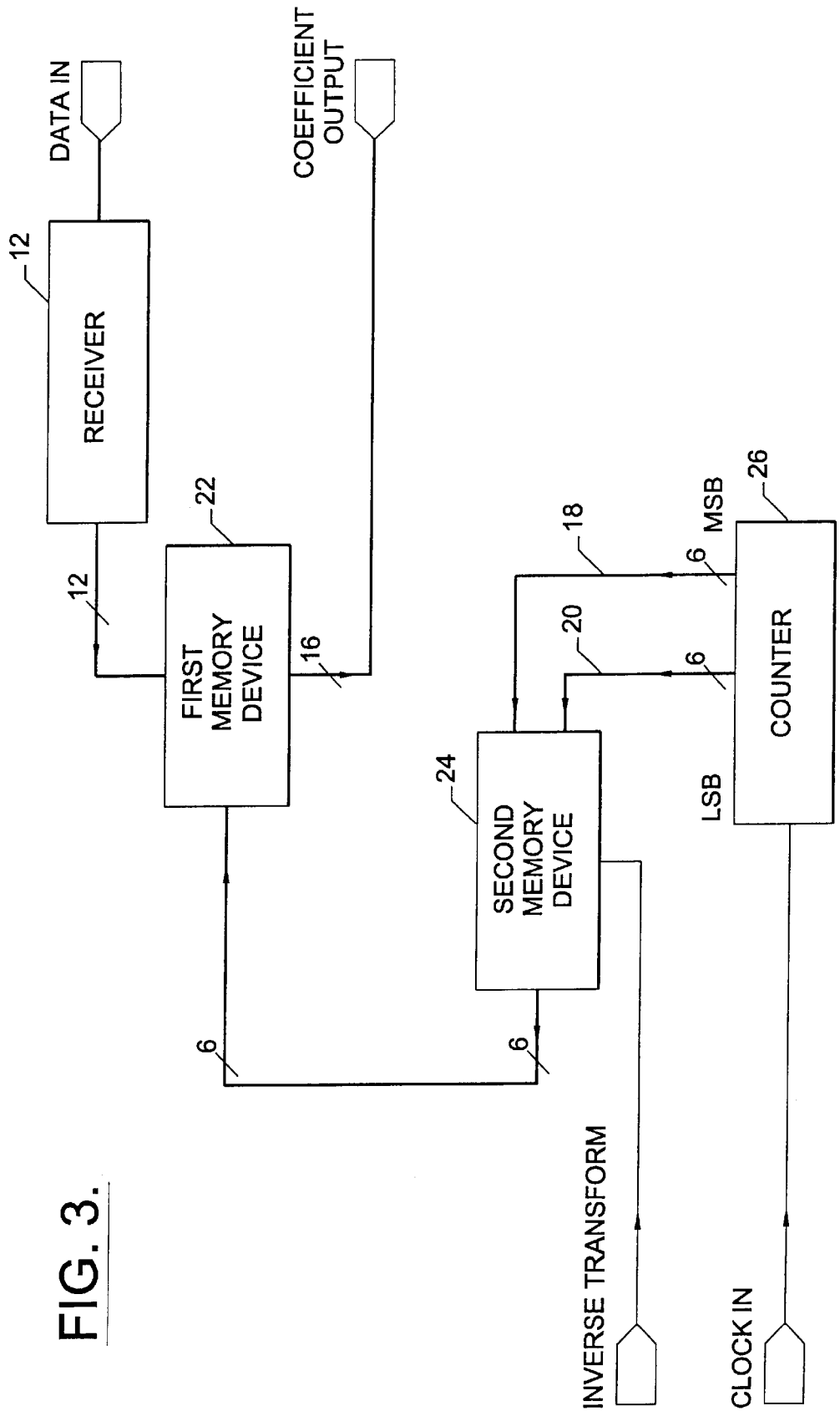
FIG. 3 is a block diagram of an apparatus for determining the coefficients of a function representative of an input signal based on a sample of the input signal using at least one memory device according to one embodiment of the present invention.

FIG. 1 illustrates the determination of the coefficients based on the use of gates, such as multipliers, adders, dividers, or other gated functions. FIG. 3 illustrates the determination of the coefficients using at least one memory device. Use of memory devices, as opposed, to gates may be advantageous as many of the values that must be calculated to determine the coefficients may be prestored in the memory devices. This, in turn, may save time in determining the coefficients.

With reference to FIG. 3, the coefficient generator of this embodiment includes a receiver 12 for receiving samples of a signal. The coefficient generator also includes a first memory device 22 in electrical communication with the receiver and a second memory device 24 in electrical communication with the first memory device. In one embodiment of the present invention, the second memory device includes an array of cells, where each cell contains a pre-calculated value representing the orthogonal function portion of the signal for each sample and coefficient. For example, the second memory device includes a cell for the orthogonal function portion of the signal for the first sample and coefficient equal to cos(2πC$_n$S$_n$/N) or cos(2π/8). In this embodiment, the first memory device may be a multiplier.

With reference to FIG. 2 and Appendix 2, in operation in this embodiment, for each sample, the receiver receives a sample of the signal and inputs the sample to the first memory device 22. (See step 100). For each coefficient, the second memory device receives a token representing the address of the cell containing the orthogonal function portion of the signal for the sample and coefficient. This token is provided by the inputs, 18 and 20, where one portion of the token is the coefficient number C$_n$ and the other portion is the sample number S$_n$. Based on the token, the second memory device retrieves the value associated with the coefficient and sample and outputs the value to the first memory device. (See step 110). The first memory device, in turn, receives the value from the second memory device and the value of the sample from the receiver. Based on these values, the first memory device generates a term representing the contribution of the sample to the coefficient, (i.e., S$_1$ cos(2π/8), for the first sample and coefficient). (See step 120). This term is then added to the coefficient, (i.e., A1+A1$_1$). (See step 130). This is repeated for each coefficient. (See steps 140 and 150).

In some embodiments of the present invention, the sample received from the receiver is one of a number of finite values. Since the orthogonal function portion for each sample and coefficient is previously known, (i.e., (2πC$_n$S$_n$/N)), and the sample can only be one of a finite number of values, values representing each sample value, sample number, and coefficient number can be pre-calculated and prestored. As such, when a sample is received, the term representing the sample's contribution to each coefficient can be determined by looking up the value in the memory device based on the value of the sample, sample number, and coefficient number.

In light of this, in one further embodiment, the first memory device is a memory device containing an array of cells. Each cell of the first memory device includes a pre-calculated value representing each sample value, sample number, and coefficient number. For each coefficient and sample, the memory device contains a group of cells, each having the orthogonal function associated with the coefficient and sample multiplied by a possible value for the sample. For example, for the first sample and coefficient, there are a group of cells having a value of S$_1$ cos(2π/8), where each cell represents the value for a different possible value of S$_1$. Additionally, the second memory device has an array of cells each having a token representing the orthogonal function portion for each sample and coefficient.

In operation, with reference to FIG. 2, for each sample, the receiver receives a sample of the signal and inputs the sample to the first memory device 22. (See step 100). For each coefficient, the second memory device receives from the inputs, 18 and 20, values representing the address of the cell containing the token representing the orthogonal function portion of the signal for the sample and coefficient. The second memory device retrieves the token associated with the coefficient and sample and outputs the token to the first memory device. (See step 110). The first memory device, in turn, receives the token from the second memory device and the value of the sample from the receiver. Based on the token and the value of the sample, the first memory device looks up the cell in the array corresponding to these values and outputs a term representing the contribution of the sample to the coefficient, (i.e., $S_1 \cos(2\pi/8)$, for the first sample and coefficient). (See step 120). This term is then added to the coefficient, (i.e., $A1+A1_1$). (See step 130). This is repeated for each coefficient. (See steps 140 and 150).

Again, it must be understood that the apparatus of this embodiment may operate in a parallel configuration to update each coefficient simultaneously by providing a plurality of first and second memory devices for each coefficient that are all connected to the receiver. In this embodiment, each first and second memory device receives the sample simultaneously and is addressed appropriately such that each set of first and second memories address values for the different coefficients. Thus, the contribution of the sample to each coefficient is determined in parallel and simultaneously.

With reference to FIG. 3, in one additional embodiment, the coefficient generator may include a counter 26 in electrical communication with the second memory device 24. The counter may be incremented by a clock, not shown, that is timed to allow calculations to be made. The counter may include two outputs, 18 and 20, which represent the coefficient number and sample number for addressing the second memory device. In operation, for each sample, the sample number is held constant, while for each cycle or plurality of cycles of the clock, the counter increments the coefficient number. This, in turn, addresses the second memory device for determining the contribution of the sample to each coefficient. After, all of the coefficients have been calculated for that sample, the sample number of the counter is incremented, and the coefficient number is reset, such that the next sample is now evaluated for each coefficient.

As detailed above, to reduce time for calculations, one embodiment of the present invention uses memory devices to store pre-calculated values and tokens to address the memory devices. An important concern in many electronic designs is the desire to minimize the number of components needed to operate the circuit and also the need to use off-the-shelf components wherever possible. In light of this, methods are needed that evaluate the need aspects of a design and determine design solutions that minimize the number of components and allow for the use of standard components.

As such, the present invention provides methods and computer program products for reducing the number of values that must be stored to represent the possible mathematical terms of a function. This method is illustrated with reference to FIG. 4 and an example of a method of reducing the number of values that must be stored in the memory device of the coefficient generator is shown in FIG. 3.

Figure 4:
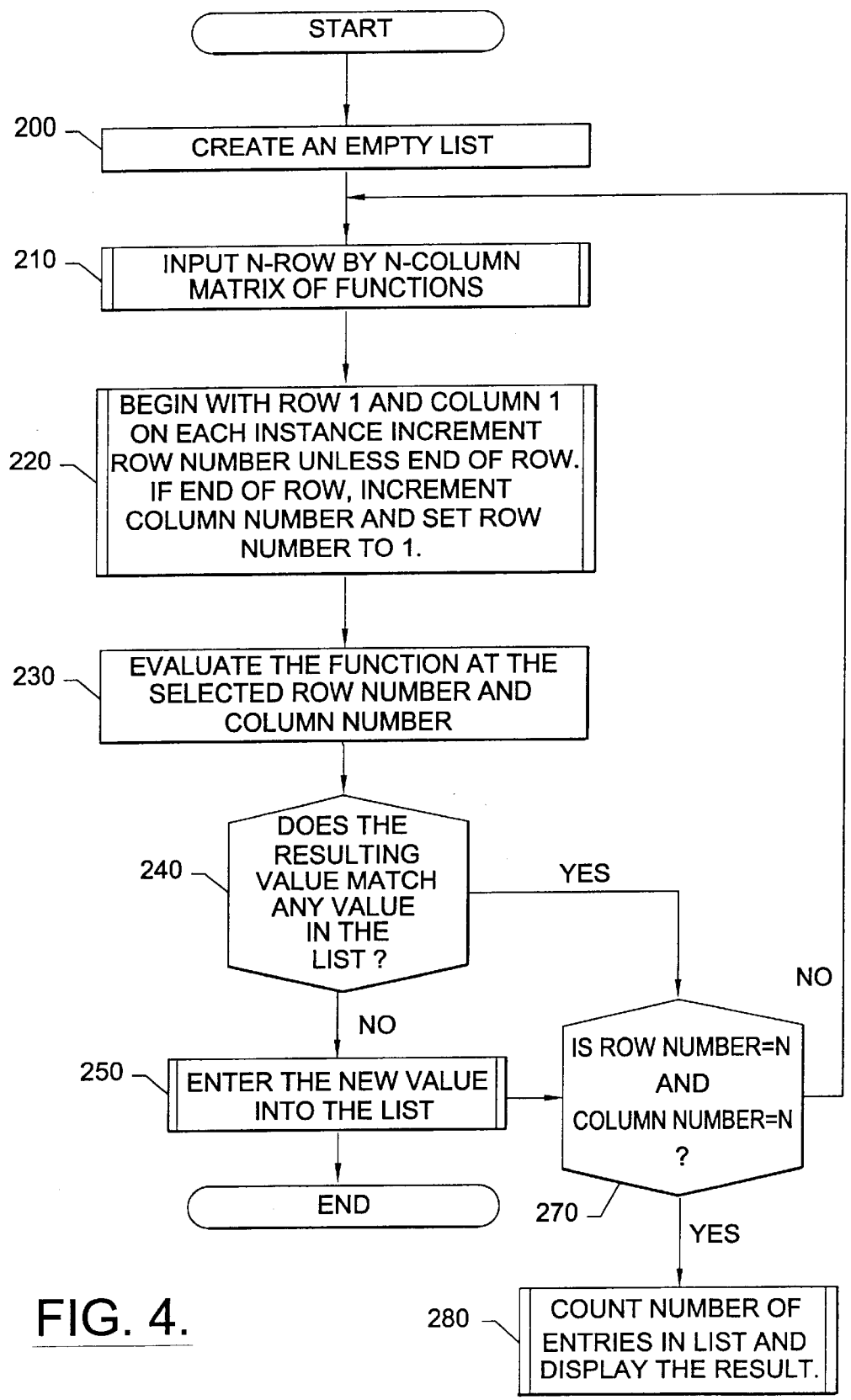
FIG. 4 is a block diagram of the operations performed to reduce the number of values that must be stored to represent the possible mathematical terms of a function according to one embodiment of the present invention.

With reference to FIG. 4, first an empty list is created, (see step 200), and all possible mathematical terms of a function are stored in a matrix. (See step 210). For example, in many mathematical functions, such as a Fourier Series, a specific array of values must be multiplied by a set of data. If the data is N-bit binary numbers and there are M numbers in the array, the number of possible products that might be formed is two to the power of N times M, ($2^{N \times M}$). For example, if a Fourier Series is based on 64 samples to generate 64 coefficients, there are 4096 trigonometric functions to be evaluated and multiplied by the samples. If the samples are each 12 bits in length, there are 4906 possible sample values. To pre-calculate and store the product of each of the possible sample values times the value of the trigonometric function for all 4096 possible sample values would require 16,777,216 stored products, which would require a rather large memory device.

With reference to FIG. 4, to reduce the number of stored values, the method and computer program product of the present invention place all the possible values in a matrix, (see step 210), and systematically compares each mathematical term in the list to all other mathematical terms in the list to determine which of the mathematical terms are redundant. (See steps 220 and 240). If the value is unique, it is stored in the generated list. (See step 250). This repeated for all values, (see step 260), and the total number of values is output. (See step 270).

Figure 5:
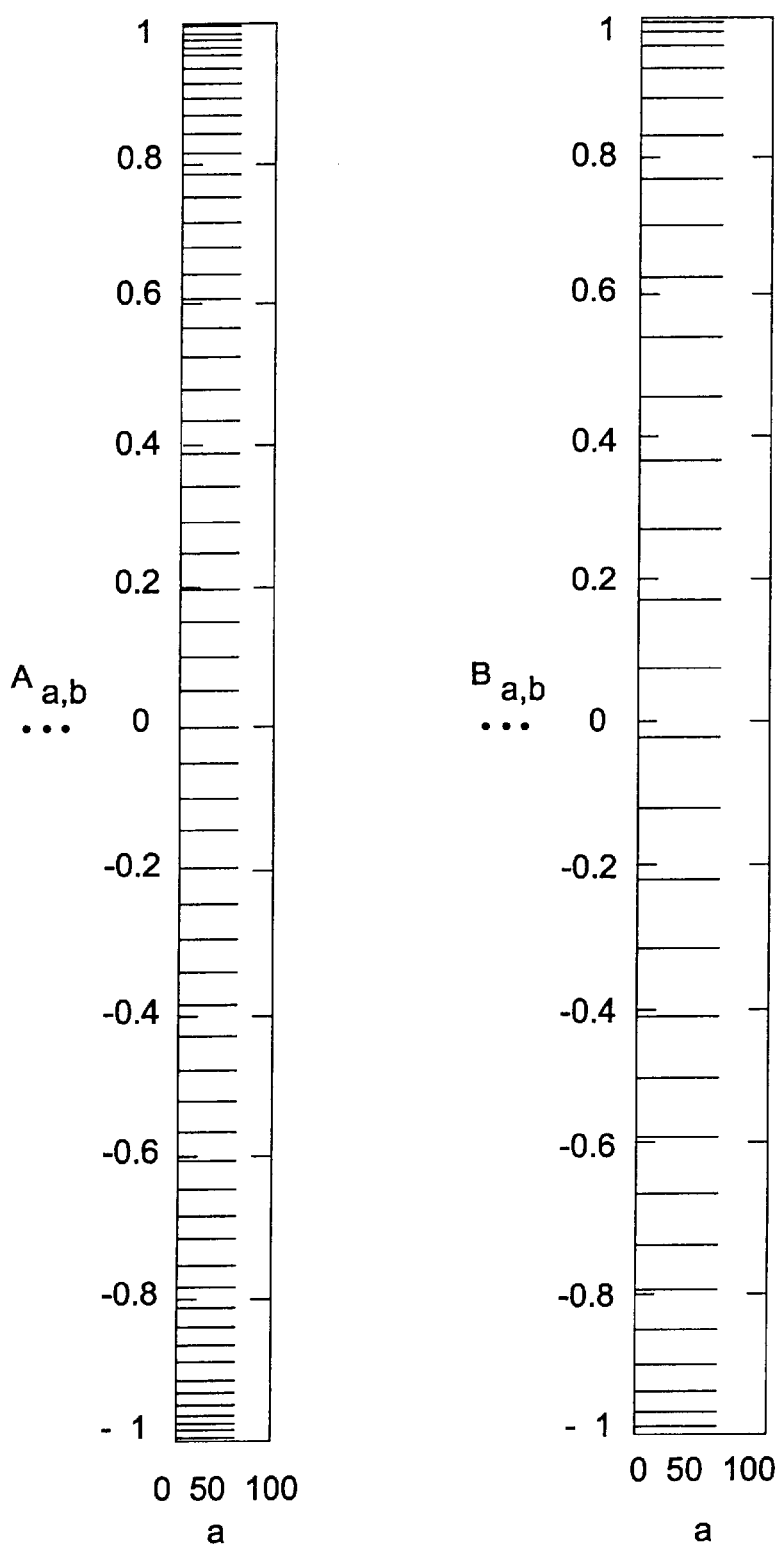
FIG. 5 is a graphic representation of the plot of coefficients determined using a Fourier Transform.

For example, for the Fourier Series, because of the properties of sine and cosine, there are only 32 different actual values required to be stored. This analysis is based on an evaluation of the sine and cosine functions that are typically used in Fourier Transforms. Specifically, FIG. 5 illustrates two graphs plotting 4096 evaluations of sine and cosine for the coefficients of a Fourier Transform using 64 samples and 64 coefficients. These graphs illustrate that there is only a finite set of values. This analysis is based on the fact that each value is related to a polarity, plus or minus. If the plus or minus of the values are signified by tokens, the absolute value of the functions are all that needs to be stored. In doing so, the requirement for memory can be reduced from 256 K to 128 K.

The number of values stored can also be reduced if the incoming sample value code representing the value of the sample is in a signed form, (i.e., positive or negative), about zero so that there is one sign bit and the remaining 11 bits are the absolute value of the 12 bit input. An 11 bit number only requires half as many memory locations for storage as 12 bits. As such, the size of the memory can be reduced to 64 K by transforming the 12 bit value into an 11 bit value and a 1 bit sign and handling the sign bit in some logic, which can similarly support the tokens.

As discussed there are 32 different values, which require 32 different tokens that must be stored. If the number of tokens could be reduced to 16, then there would be 16 values times 2048 possible sample value, which is 32 K. This can be accomplished by observing that one of the values is zero and all 4096 values associated with it become zero. Instead, of providing tokens for the zero values, the token itself can contain a bit dedicated to zero. As such, a set of 16 tokens can be used, where 4 bits are the address, a sign bit to represent the sign of the value, and a zero bit to represent when the value is zero.

As illustrated, the method and computer program products of the present invention can be used to reduce the number of values that must be stored. This, in turn, allows for the use of minimum and standard hardware. For example, in the above example where 64 samples of a signal are taken using a 12 bit sample code, the first memory device for storing all of the pre-calculated values can be reduced to a 128 K memory, and the second memory for storing the tokens can be reduced to an 8 K memory.

Although the method and computer program products of the present invention for reducing the number of stored values are illustrated in the context of a Fourier Series with a predecribed number of samples and sample bit size, it must be understood that the methods and computer program products for reducing the number of required values that must be stored can be used with any function, number of prescribed samples, and/or sample bit size.

Figure 6:
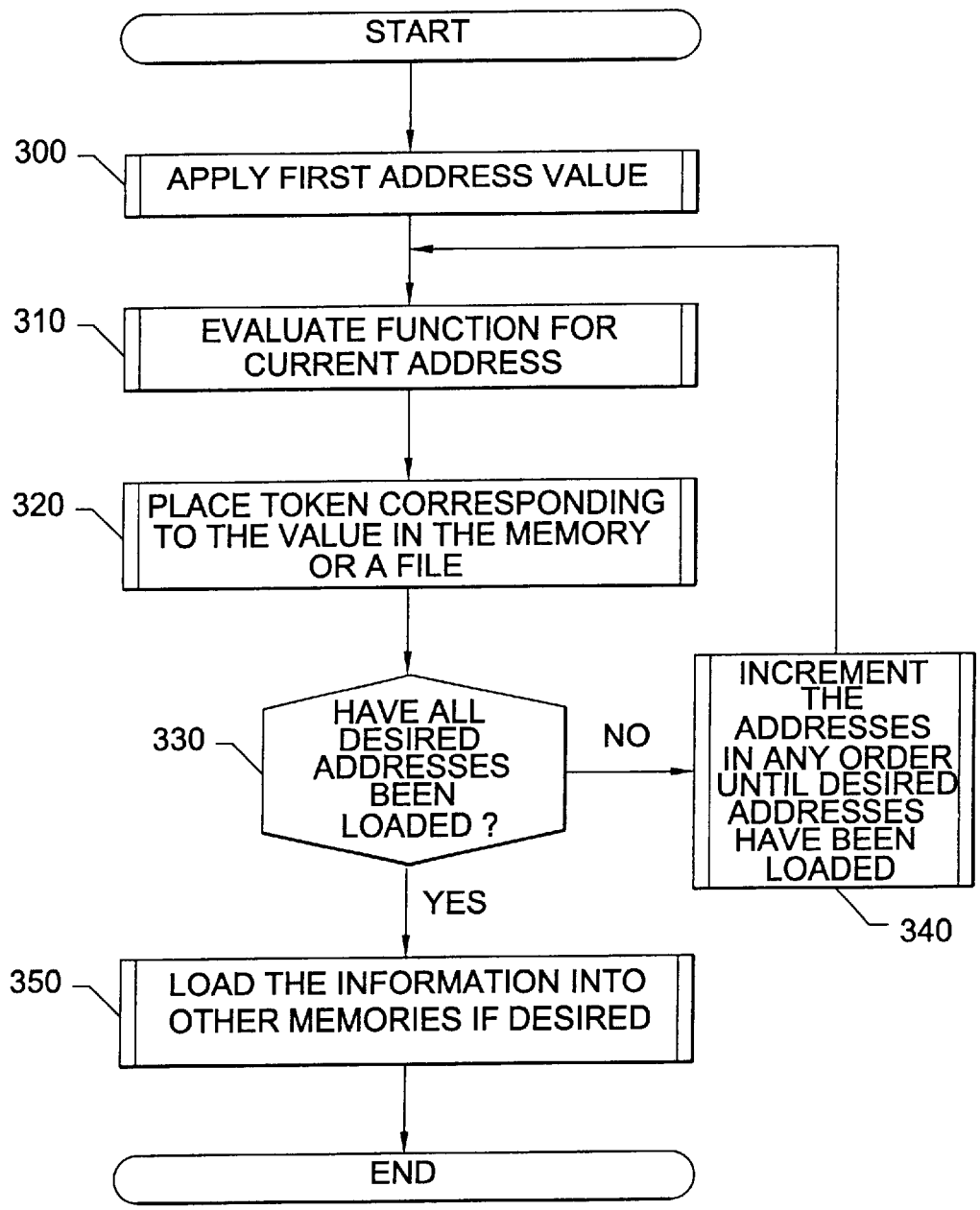
FIG. 6 is a block diagram of the operations performed to create a table of tokens, where each token represent a value of the function according to one embodiment of the present invention.

After the number of stored values has been determined, the values should be addressed with tokens that are stored in the second memory device. With reference to FIG. 6, to create addresses/tokens for storage, the method initially applies an address to a value, (see steps 300 and 310). A token related to the address is then selected. (See step 320). The method next checks to see if all values have been addressed. (See step 330). If not, the method increments the address in any order, (see step 340). Once all values have been addressed, they are loaded into memory. (See step 350). Similarly, once a set of values is known for the tokens, it is common to find an arrangement of adders or other gating that replaces the table with the same response to each address and a saving in the number of transistors or whatever measure is most meaningful in the technology being implemented. This is called a gated function rather than a table.

Figure 7:
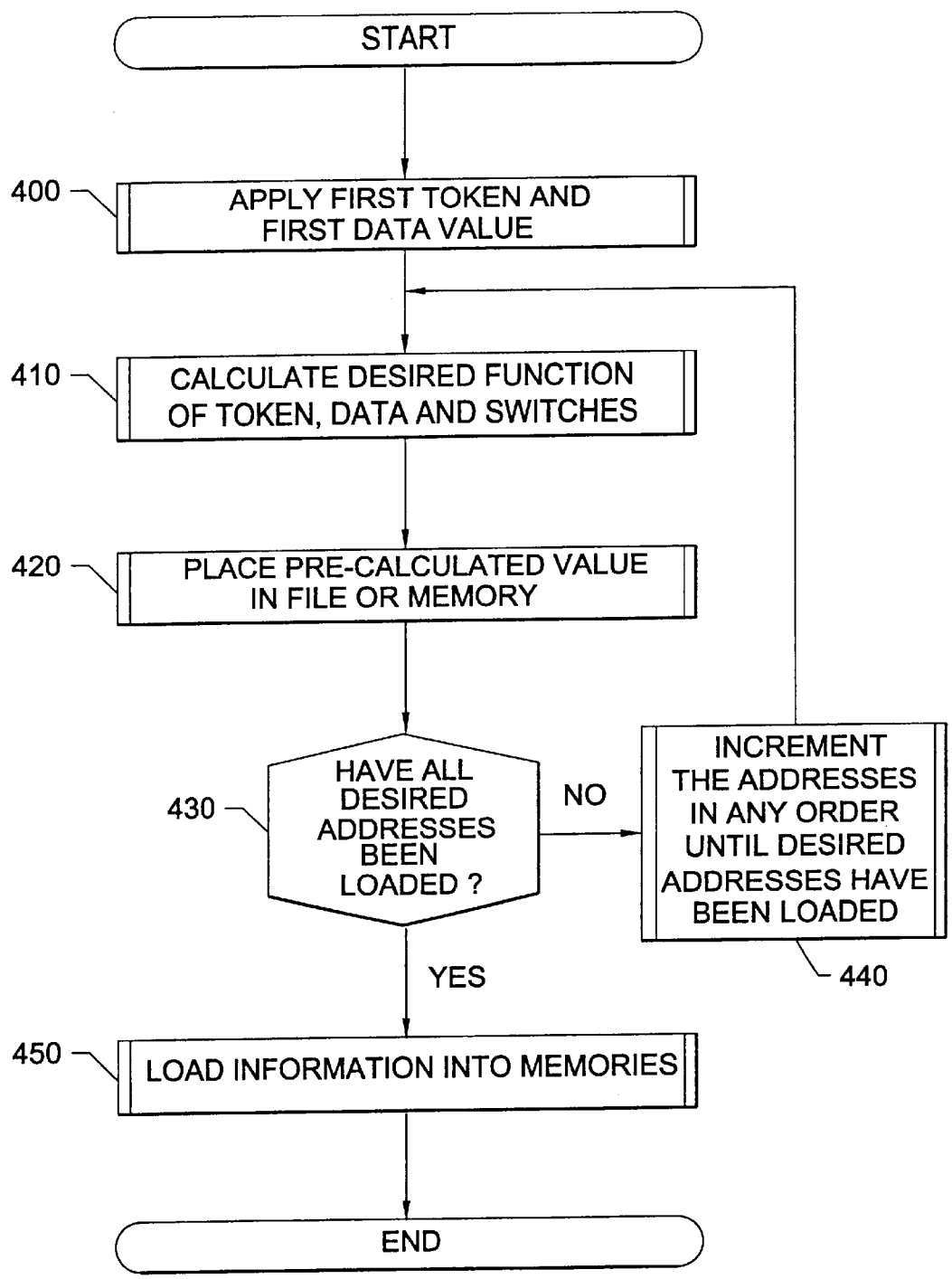
FIG. 7 is a block diagram of the operations performed to create a table of addressable values according to one embodiment of the present invention.

With reference to FIG. 7, in addition to creating and storing tokens, the pre-calculated values should also be loaded into the first memory device. Specifically, for each possible sample value, the method and computer program products of the present invention, takes a first token and applies the value of the token and a possible value of the sample to the function to create a pre-calculated value of the function for the sample value. (See step 400 and 410). The pre-calculated value is then stored in memory. (See step 420). The method next checks to see if all values have been addressed. (See step 430). If not, the method increments the address in any order, (see step 440). Once all values have been addressed, they are loaded into memory. (See step 450). Similarly, once a set of values is known for the tokens, it is common to find an arrangement of multipliers or other gating that replaces the table with the same response to each address and a saving in the number of transistors or whatever measure is most meaningful in the technology being implemented. This is called a gated function rather than a table.

Figure 8:
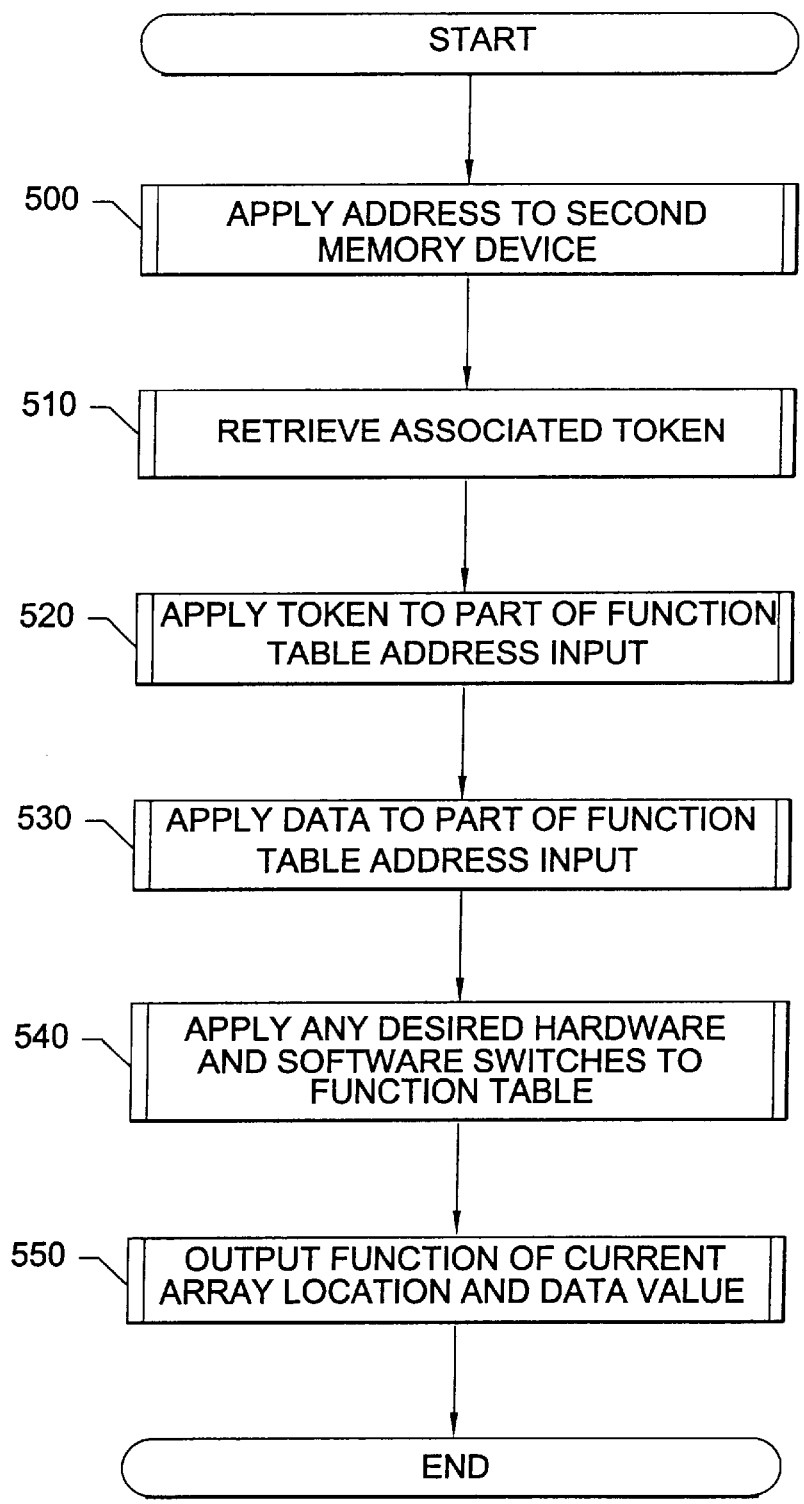
FIG. 8 is a block diagram of the operations performed to retrieve values from a table based on tokens according to one embodiment of the present invention.

FIG. 3, described above, illustrates use of memory devices and tokens to determine the coefficient of a function. FIG. 8, however, illustrates a more general use of the memory devices and tokens developed above in FIGS. 4, and 6–7. Specifically, to use the memory device and tokens to determine a value, the address representing a desired token is applied to the second memory device, (see step 500), and the token is retrieved. (See step 510). The token is then applied to the first memory device, along with the value of the sample to create the address for accessing the first memory device. (See steps 520 and 530). If the token includes a sign bit or zero bit that are set, the value associated with token in the first memory device is altered appropriately. (See step 540). Finally, the value is output. (See step 550).

Figure 9:
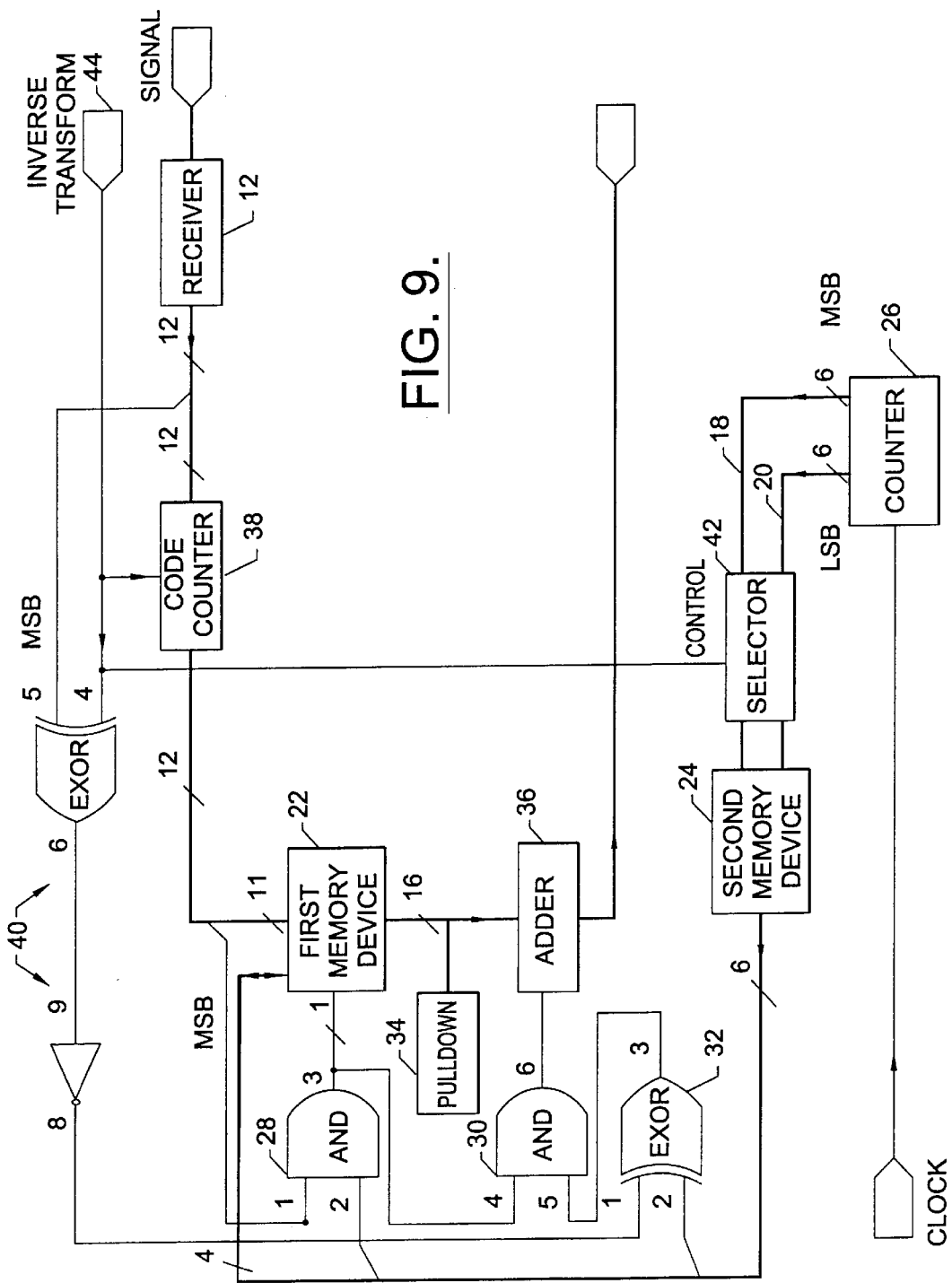
FIG. 9 is a block diagram of an apparatus for determining the coefficients of a function representative of an input signal based on a sample of the input signal using memory devices and gates according to one embodiment of the present invention.

As discussed above, the number of values that must be stored to calculate the coefficients of function can be decreased by removing redundant values, storing only the magnitude of the values, and using token bits to signify when a value is zero or the sign of a value. FIG. 9 provides an illustrative embodiment for determining the coefficients of a function using a first memory device having the minimum number of values stored, a second memory device with tokens that include bits for indicating sign and zero, and a signed input value. As with the previous embodiment, the coefficient generator 10 of this embodiment includes first and second memory devices, 22 and 24. Both of the memory devices include arrays of cell for storing values. The second memory device includes tokens representing the coefficient and sample number, and the first memory device includes all of the possible unique values of the sample combined with the orthogonal function portion for each sample and coefficient. For example, for the first sample $S_1$ and second coefficient $C_1$, the token stored in the second memory device designates the sample number and coefficient number, $S_1$ and $C_1$. Stored in the first memory device is a number of cells each having a value defined by the equation $(S_1 \cos(2\pi C_n S_n/N)$ or $(S_1 \cos(2\pi/N))$, with each cell storing the application of a possible value of the sample $S_1$ to the equation.

Additionally, the coefficient generator of this embodiment also includes a first AND gate 28 in electrical communication with the receiver 12, the output of the second memory device, and an input of the first memory device. The coefficient generator also includes a second AND gate 30 connected to the output of the first AND gate 28 and an XOR gate 32. Connected to the output of the second AND gate 30 is an adder 36, typically implemented so as to take the twos complement of a signal. The XOR gate 32 is in electrical communication with the output of the second memory device and a gate combination 40 to be discussed later. The coefficient generator of this embodiment also includes a null device or pull down 34 in electrical communication with the output of the first memory device.

Importantly, to reduce the number of values that must be stored, the sample received by the receiver is in a 12 bit code, where one of the bits is a sign bit. As discussed, by reducing the bit representation of the sample to 11 bits and using one bit for the sign, storage space is reduced. To this end, in some embodiments, the coefficient generator also includes a code converter 38 in electrical communication with the receiver 12. If the sample output by the receiver is not in the proper 12 bit format, the code converter will convert the sample into a 12 bit value having 11 bits representing the value and 1 bit for the sign.

The coefficient generator of this embodiment also uses a 6 bit token stored in the second memory device to address the values stored in the first memory device. Importantly, to decrease the number of values that must be stored, one of the bits represents the sign of the number and one of the bits represents whether the value is zero. The tokens operate in conjunction with the second AND gate 30 and adder 36 to take the negative of the output of the first memory device, if the sign bit of the token indicates the negative of the value. Further, the null or pull down device 34, the zero bit of the token, and the AND gate 28 operate to null or zero the output of the first memory device, if the token indicates that the value should be zero.

Figure 10:
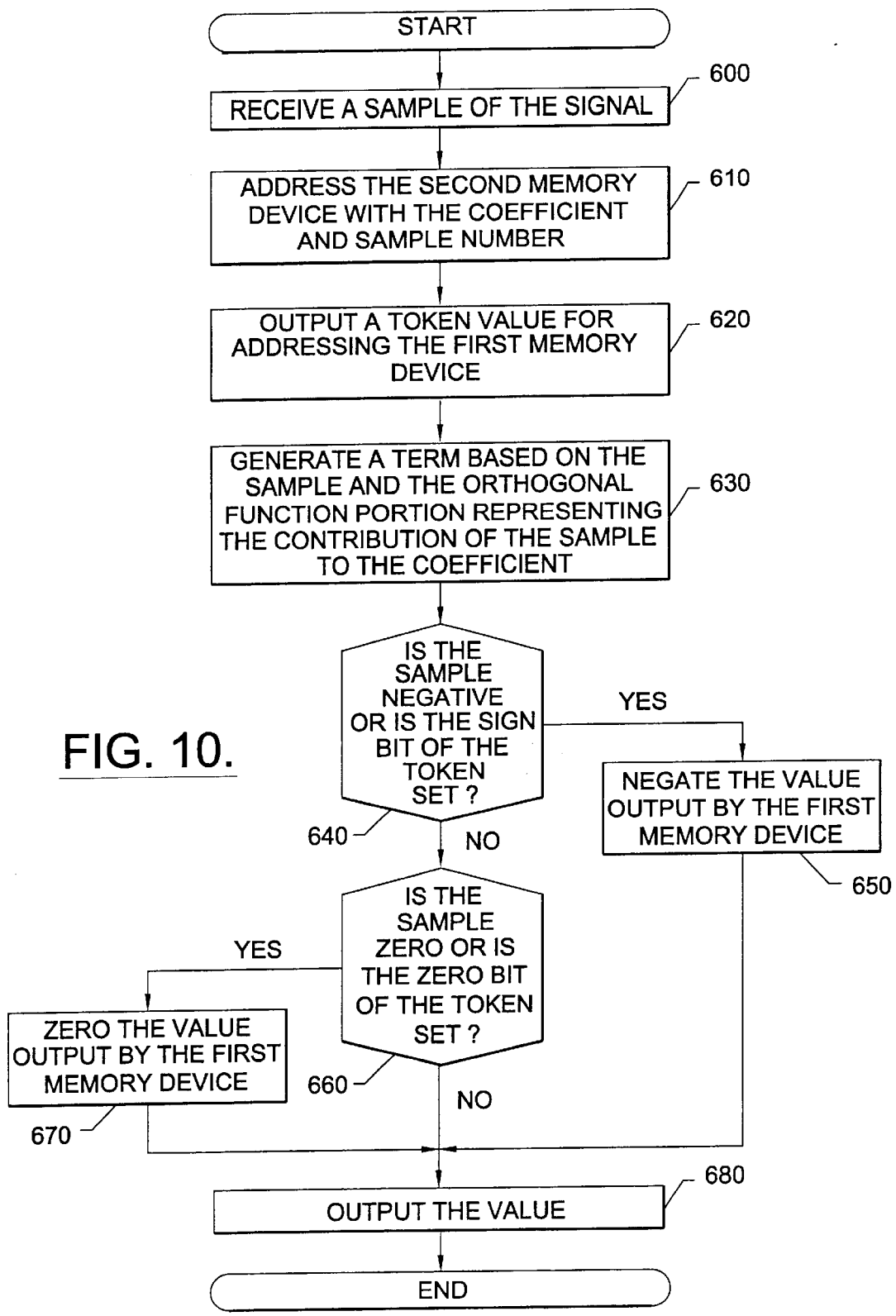
FIG. 10 is a block diagram of the operations performed to determine the coefficients of a function representative of an input signal based on a sample of the input signal using memory devices and gates according to one embodiment of the present invention.

With reference to FIG. 10, in operation in this embodiment, for each sample, the receiver receives a sample of the signal and inputs the sample to the first memory device 22. (See step 600). For each coefficient, inputs, 18 and 20, are provided to the second memory device representing the sample number and coefficient number. (See step 610). Based on the inputs, the second memory device outputs a token having 4 bits representing the sample and coefficient number, 1 bit representing whether the value is negative, and 1 bit representing whether the value is zero or not. (See step 620). The first memory device, in turn, receives the token from the second memory device and the value of the sample from the receiver. Based on these values, the first memory device generates a term representing the contribution of the sample to the coefficient, (i.e., $S_1 \cos(2\pi/8)$, for the first sample and coefficient). (See step 630).

Additionally, the sign bit of the sample and the output of the sign bit of the token are supplied to the second AND gate 30. If either the sign of the signal is negative or the sign bit of the token is set, the second AND gate outputs a carry bit to the adder 36. The adder will make the output of the first memory device negative. (See steps 640 and 650).

Likewise, the token and the signal are both provided to the first AND gate 28. If either the signal or the token indicates a zero value, a zero value is output by the first AND gate 28.

The zero value is sent to the second AND gate 30, which prohibits the second AND gate 30 from negating the signal. Further, a zero value is output to the first memory device, which disables the first memory device. Due to the disablement of the first memory device, the null or pull down device 34 outputs a zero value representing the value of the coefficient. (See steps 660 and 670). The term of the coefficient is then output. (See step 680).

As illustrated in FIG. 9, in one embodiment, the coefficient generator further includes a counter 26 in electrical communication with the second memory device. The counter may be incremented by a clock, not shown, that is timed to allow calculations to be made. The counter may include two outputs, 18 and 20, which represent the coefficient number and sample number for addressing the second memory device. In operation, for each sample, the sample number is held constant, while for each cycle or plurality of cycles of the clock, the counter increments the coefficient number. This, in turn, addresses the second memory device for determining the contribution of the sample to each coefficient. After all of the coefficients have been calculated for that sample, the sample number of the counter is incremented, and the coefficient number is reset, such that the next sample is now evaluated for each coefficient.

Further, and importantly, FIG. 9 also illustrates another aspect of the present invention. As discussed above, the apparatus, methods, and computer programs products of the present invention determine the coefficients of a function representative of an input signal based on a predetermined plurality of samples of the input signal. However, the apparatus, methods, and computer program products may also determine the coefficients representing an inverse function of the signal. For example, many data processing systems are equipped to perform both a DFT and an inverse DFT of the signal.

The inverse DFT is essentially performing the DFT in the reverse sense. As the first memory device includes all of the possible values of the DFT, the inverse DFT can be determined by merely addressing the values in the first memory device that correspond to the values of the inverse DFT. With reference to FIG. 9, to implement an inverse DFT, the coefficient generator further includes a third gate 40 having and XOR and NOT gate. The third gate has inputs connected to the sign bit of the 12 bit signal and an input for indicating when to perform an inverse function 44. The output of the third gate is connected to XOR gate 32, along with the output of the second memory device. Further, the coefficient generator also includes a selector or crossbar 42 in electrical communication with the inputs, 18 and 20, to the second memory device. The crossbar is also connected to the input 44 indicating whether perform an inverse function.

In operation, the inverse function, (e.g., inverse DFT), operates similar to the operation to determine the function (e.g., DFT), as discussed in FIG. 10. Except that the selector or crossbar switches the address input lines to the first memory device. Specifically, if the coefficients for an inverse function of a signal are desired, the selector alters the address indicated by the token such that the token addresses a cell of the first memory device containing a pre-calculated value representing an inverse mathematical function of the signal. Further, the third gate 40 operates in conjunction with the second AND gate 30 to negate the signal when either the mathematical function or input signal are negative. As such, the apparatus, methods, and computer program products of the present invention can determine the function or the inverse function using the same components and stored values, merely by switching the values that are addressed to perform the inverse function.

Figure 11:
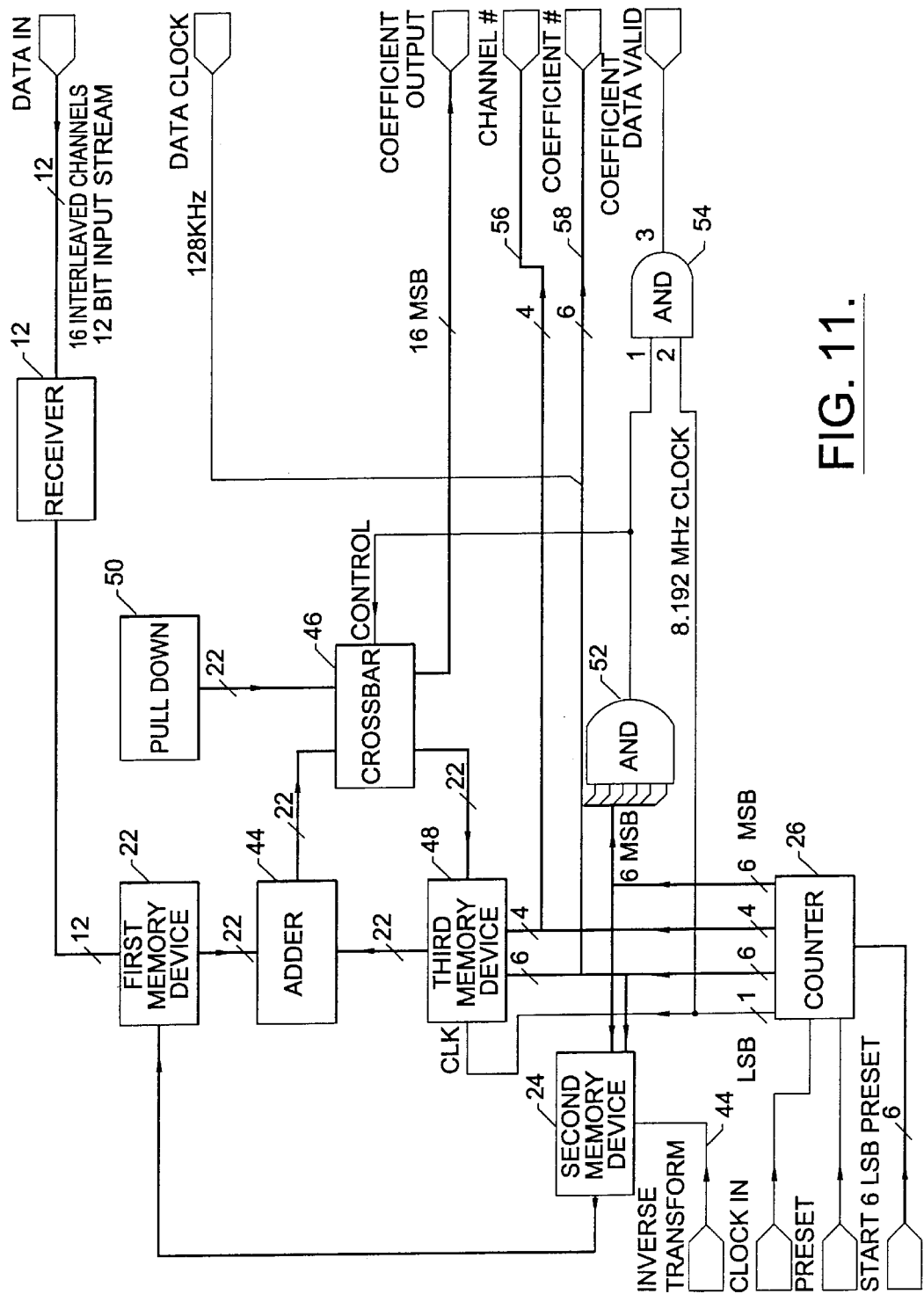
FIG. 11 is a block diagram of an apparatus for determining the coefficients of a function representative of an input signal based on a plurality of samples of the input signal according to one embodiment of the present invention.
Figure 12:
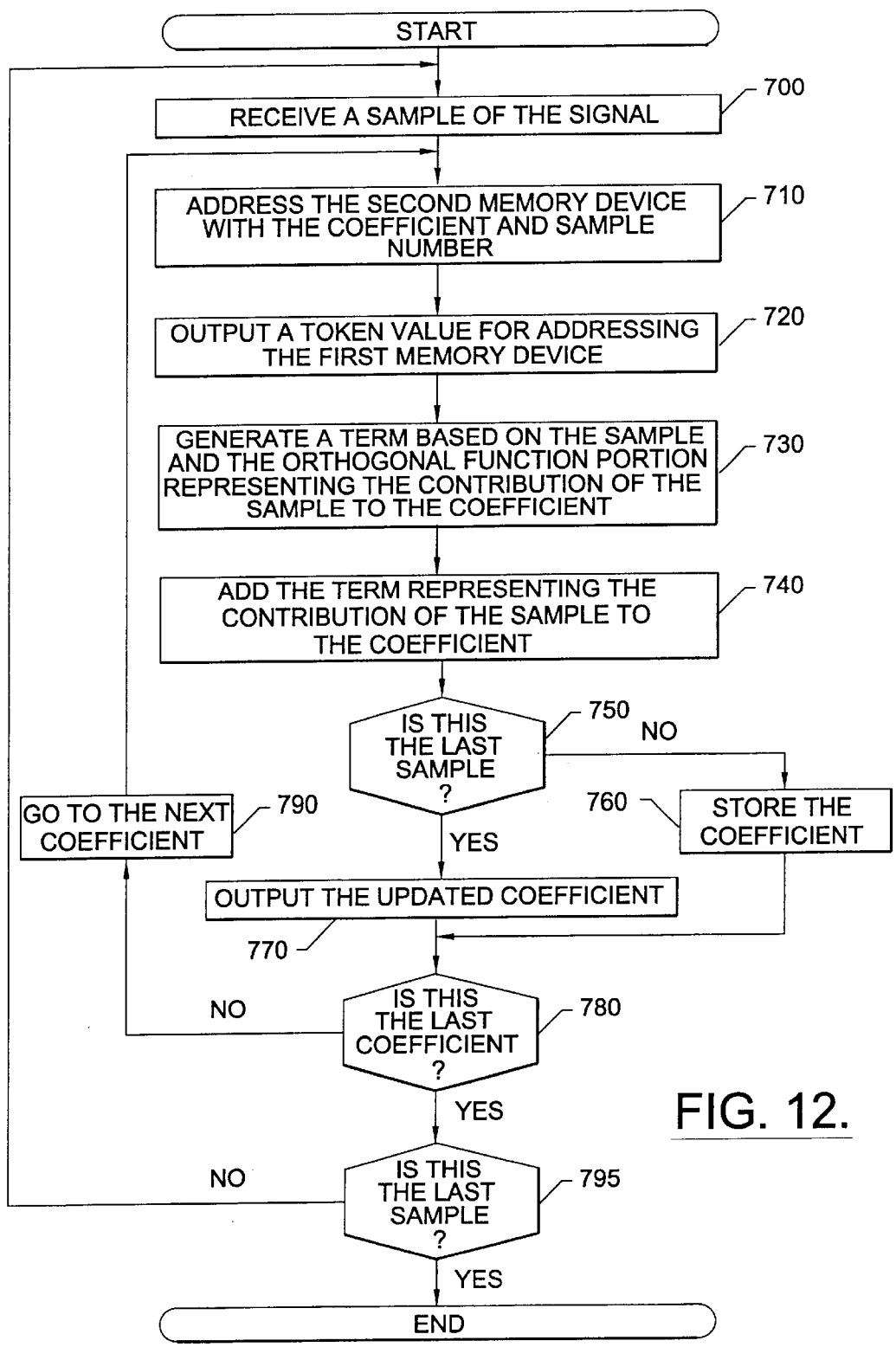
FIG. 12 is a block diagram of the operations performed to determine the coefficients of a function representative of an input signal based on a plurality of samples of the input signal according to one embodiment of the present invention.

As provided above, the apparatus, methods, and computer program products of the present invention determine the coefficients of a function representative of a signal by updating each coefficient as each sample is received. FIGS. 1, 3, and 9 illustrate the updating of the coefficients for one sample. FIG. 11, discussed in detail below, illustrates the determination of the coefficients based on a plurality of samples, and in particular, illustrates the updating of each coefficient for each sample received.

Similar to previous embodiments, the coefficient generator 10 of this embodiment includes first and second memory devices, 22 and 24. Both of the memory devices include arrays of cells for storing values. The second memory device includes tokens representing the coefficient and sample number, and the first memory device includes all of the possible unique values of the sample combined with the orthogonal function portion for each sample and coefficient. Although any system or device may be used for addressing the second memory device, the present embodiment illustrates a counter 26 to address the second memory device.

The coefficient generator of this embodiment further includes an adder 44 in electrical communication with the output of the first memory device. Connected to the adder 44 is a crossbar 46 and a third memory device 48. The coefficient generator also includes a null or pull down device 50 in electrical communication with the crossbar, and an AND gates, 52 and 54, connected to the output of the counter.

With reference to FIG. 11, in operation in this embodiment, for each sample, the receiver receives a sample of the signal and inputs the sample to the first memory device 22. (See step 700). For each coefficient, inputs, 18 and 20, are provided to the second memory device representing the sample number and coefficient number from the counter. (See step 710). Based on the inputs, the second memory device outputs a token. (See step 720). The first memory device, in turn, receives the token from the second memory device and the value of the sample from the receiver. Based on these values, the first memory device generates a term representing the contribution of the sample to the coefficient. (See step 730). The term is next provided to the adder 44, which also receives the previous value of the coefficient from the third memory device 48. The third memory device is also connected to the second memory device. The token from the second memory device addresses the coefficient stored in the third memory device, which, in turn, is output to the adder for adding to the term. The term is added to the existing coefficient by the adder. (See step 740).

After, the coefficient is updated, the coefficient generator next determines whether the last sample has been processed. (See step 750). Specifically, the AND gate 52 is connected to the six most significant bits of the counter, which designate the sample number. If the sample number is the last sample number of the set, (in this case the 64th sample), the six most significant bits of the counter will be all ones. When all ones are input in to the AND gate 52, the AND gate outputs a one indicating that the last sample has been received.

If the last sample has not been received, the crossbar 46 directs the updated coefficient from the adder 44 to the third memory device 48, where the updated coefficient is stored. (See step 760). The null or pull down device 50 also outputs a zero on the output indicating that the coefficients have not been calculated.

On the other hand, if the last sample has been received, the crossbar 46 directs the updated coefficient from the adder 44 to the output. (See step 770). Further, the null or pull down device 50 is directed by the cross bar to zero or null the value stored in the third memory device as a reset. Further, the AND gate 54 indicates that the coefficient value output is a valid value, instead of zero.

The above steps are repeated for each coefficient until all of the coefficients have been updated with the sample. (See step 780 and 790). Further, the process is repeated for each sample, until all samples are received and each coefficient is updated. (See step 795).

FIG. 11 also illustrates another aspect of the present invention. Specifically, in one embodiment, the coefficient generator of the present invention is connected to a plurality of signal channels, such that the coefficient generator determines coefficients for functions representing signals located on each channel. In this embodiment, the counter also outputs a count value indicating the channel for which the coefficient generator is currently processing a signal. The channel number and coefficient number are output on lines, 56 and 58. The coefficient generator operates similar to the previous embodiments. Specifically, the coefficient generator is first connected to the first channel, where it receives a sample and updates the coefficients associated with the first channel. The coefficient generator goes to each channel and receives a sample and updates the coefficients associated with the signal on that channel. This is repeated until all of the samples for all channels have been received and the coefficients for the signal on each channel have been updated. In another embodiment, the coefficient generator may receive and process all the samples for one channel before switching to the next channel.

Figure 13:
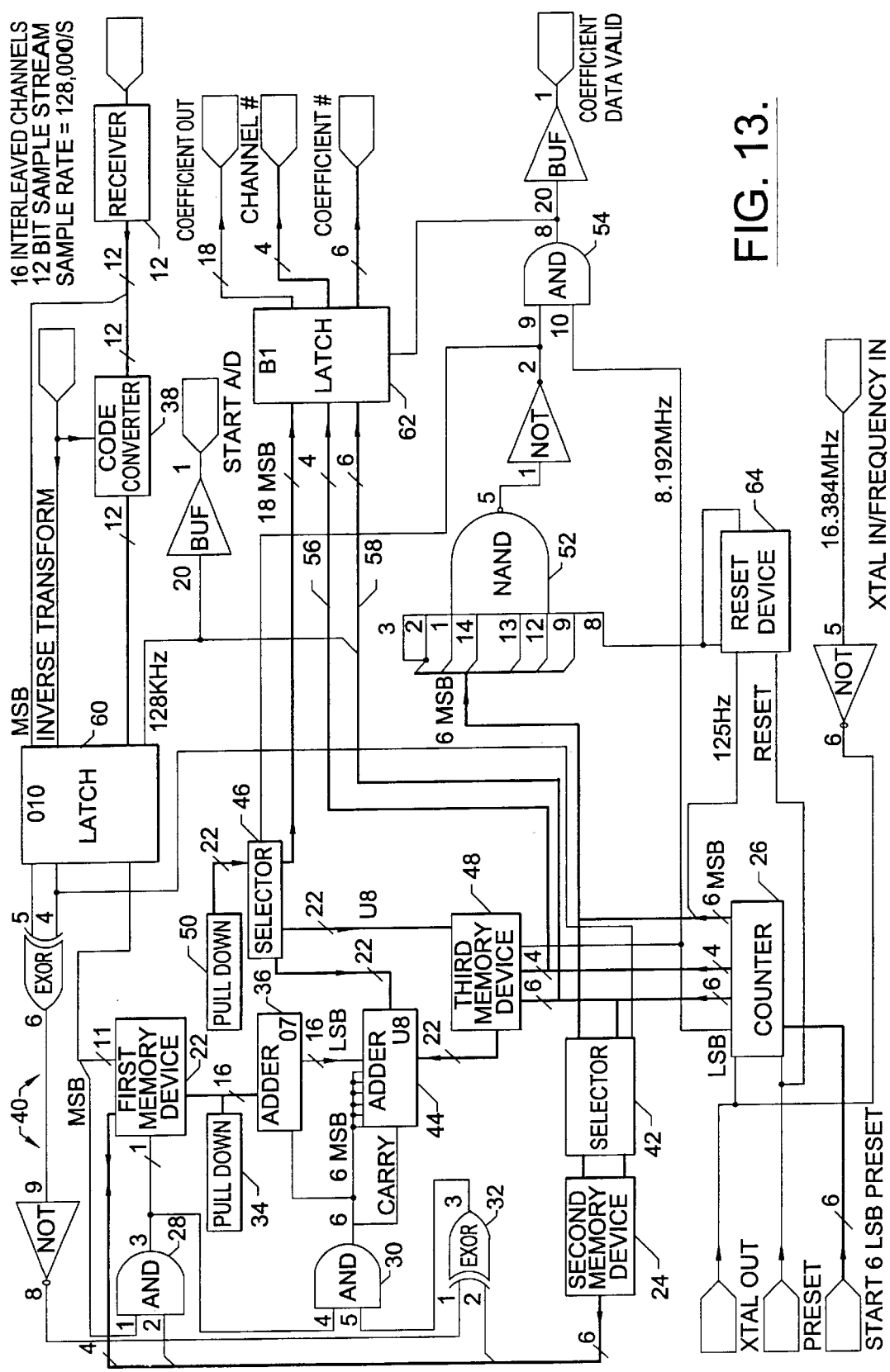
FIG. 13 is a block diagram of an apparatus for determining the coefficients of a function representative of an input signal based on a plurality of samples of the input signal using memory devices and gates according to one embodiment of the present invention.

As discussed previously, it sometimes advantageous to reduce the amount of data that must be stored by eliminating redundant values, storing only the magnitude of the values, and using tokens to designate sign or whether the value is zero. As such, FIG. 13 illustrates the coefficient generator of FIG. 11 with the addition of gates to reduce the amount of values that must be stored. Specifically, similar to the previous embodiment, the coefficient generator 10 of this embodiment includes first and second memory devices, 22 and 24. Both of the memory devices include arrays of cell for storing values. The second memory device includes tokens representing the coefficient and sample number, and the first memory device includes all of the possible unique values of the sample combined with the orthogonal function portion for each sample and coefficient. Although any system or device may be use for addressing the second memory device, the present embodiment illustrates a counter 26 to address the second memory device.

The coefficient generator of this embodiment further includes an adder 44 in electrical communication with the output of the first memory device. Connected to the adder 44 is a crossbar or selector 46 and a third memory device 48. The coefficient generator also includes a null or pull down device 50 in electrical communication with the crossbar, and a NAND gate 52 and AND gate 54, connected to the output of the counter.

Additionally, the coefficient generator of this embodiment also includes a first AND gate 28, a second AND gate 30, and an XOR gate 32. Connected to the output of the second AND gate 30 is an adder 36, typically implemented so as to take the twos complement of a signal. The XOR gate 32 is in electrical communication with the output of the second memory device and a gate combination 40. The coefficient generator of this embodiment also includes a null device or pull down 34 in electrical communication with the output of the first memory device.

The coefficient generator also includes a code converter 38 in electrical communication with the receiver 12 for converting the input signal, if necessary, to a 12 bit value having 11 bits representing the value and 1 bit for the sign. The coefficient generator of this embodiment also uses a 6 bit token stored in the second memory device to address the values stored in the first memory device. As with the previous embodiment, the tokens operate in conjunction with the second AND gate 30 and adder 36 to take the negative of the output of the first memory device, if the sign bit of the token indicates the negative of the value. Further, the null or pull down device 34 and the zero bit of the token operate to null or zero the output of the first memory device, if the token indicates that the value should be zero.

Still further, the coefficient generator includes a first 60 latch for latching the input signal and a second latch 62 for latching out the output coefficient values. The coefficient generator also includes an input 44 and gate combination 40 for using the coefficient generator to determine the coefficients of an inverse function of the signal. Further, the coefficient generator includes reset device 64 for resetting the memory and outputs 56 and 58 for outputting the coefficient and channel number.

Figure 14:
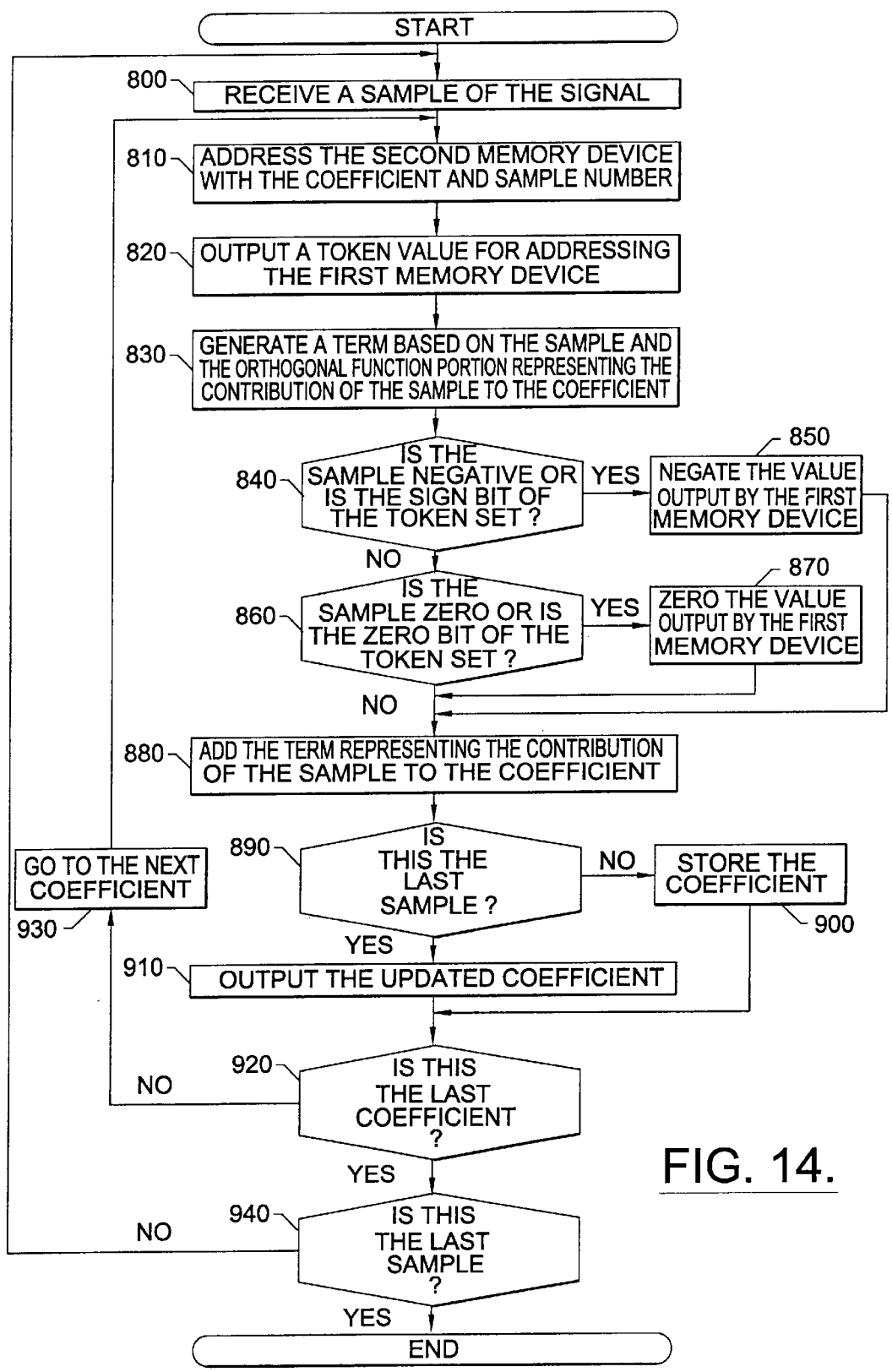
FIG. 14 is a block diagram of the operations performed to determine the coefficients of a function representative of an input signal based on a plurality of samples of the input signal using memory devices and gates according to one embodiment of the present invention.

With reference to FIG. 14, in operation in this embodiment, for each sample, the receiver receives a sample of the signal and inputs the sample to the first memory device 22. (See step 800). For each coefficient, inputs, 18 and 20, are provided to the second memory device representing the sample number and coefficient number. (See step 810). Based on the inputs, the second memory device outputs a token having 4 bits representing the sample and coefficient number, 1 bit representing whether the value is negative, and 1 bit representing whether the value is zero or not. (See step 820). The first memory device, in turn, receives the token from the second memory device and the value of the sample from the receiver. Based on these values, the first memory device generates a term representing the contribution of the sample to the coefficient. (See step 830).

Additionally, the sign bit of the sample and the output of the sign bit of the token are supplied to the second AND gate 30. If either the sign of the signal is negative or the sign bit of the token is set, the second AND gate outputs a carry bit to the adder 36. The adder will make the output of the first memory device negative. (See steps 840 and 850).

Likewise, the token and the signal are both provided to the first AND gate 28. If either the signal or the token indicates a zero value, a zero value will be output by the first AND gate 28. The zero value is sent to the second AND gate 30, which prohibits the second AND gate 30 from negating the signal. Further, a zero value is output to the first memory device, which disables the first memory device. Due to the disablement of the first memory device, the null or pull down device 34 outputs a zero value representing the value of the coefficient. (See steps 860 and 870). The term of the coefficient is then output.

The term is next provided to the adder 44, which also receives the previous value of the coefficient from the third memory device 48. The third memory device is also connected to the second memory device. The token from the second memory device addresses the coefficient stored in the third memory device, which, in turn, is output to the adder for adding to the term. The term is added to the existing coefficient by the adder. (See step 880).

After, the coefficient is updated, the coefficient generator next determines whether the last sample has been processed. (See step 900). Specifically, the AND gate 52 is connected to the six most significant bits of the counter, which designate the sample number. If the sample number is the last sample number of the set, (in this case the 64th sample), the six most significant bits of the counter will be all ones. When all ones are input to the AND gate 52, the AND gate outputs a one indicating that the last sample has been received.

If the last sample has not been received, the crossbar or selector 46 directs the updated coefficient from the adder 44 to the third memory device 48, where the updated coefficient is stored. (See step 900). The null or pull down device 50 also outputs a zero on the output indicating that the coefficients have not been calculated.

On the other hand, if the last sample has been received, the crossbar 46 directs the updated coefficient from the adder 44 to the output. (See step 910). Further, the null or pull down device 50 is directed by the cross bar to zero or null the value stored in the third memory device as a reset. Further, the AND gate 54 indicates that the coefficient value output is a valid value, instead of zero.

The above steps are repeated for each coefficient until all of the coefficients have been updated with the sample. (See step 920 and 930). Further, the process is repeated for each sample, until all samples are received and each coefficient is updated. (See step 940).

Additionally, the first and second latches, 60 and 62, are synchronized with the counter so as to output the coefficients and receive a new sample based on the clock cycle. Further, the reset device 64 resets the memory.

As detailed above, the apparatus, methods, and computer program products of the present invention process a plurality of samples and generate the coefficients of the function based on the samples. In some embodiments of the present invention, after the plurality of samples have been received, the apparatus, methods, and computer program products of the present invention output the generated coefficients, reset the coefficients, and again take samples of the signal. In some embodiments, however, it may be advantageous to generate and output a complete set of coefficients as each new sample is received and processed. This is referred to as a Sliding Aperture Fourier Transform (SAFT).

In this embodiment, the apparatus, methods, and computer program products of the present invention do not reset each of the coefficients to zero after the final sample of a plurality of samples has been received and the coefficients have been output. Instead, the apparatus, methods, and computer program products of the present invention replace the first sample of the previous plurality of samples with the next received sample. Using this new sample, the apparatus, methods, and computer program products of the present invention output a next set of coefficients. As such, instead of generating a set of coefficients for each "batch" of samples, the apparatus, methods, and computer program products of the present invention generates a set of coefficients each time a new sample is received, thereby providing a new set of coefficients for each time a new sample is received.

The present invention provides several apparatus, methods, and computer program products for generating a set of coefficients each time a new sample is received. In each of these embodiments, the apparatus, methods, and computer program products of the present invention replace the contribution of the first sample of the previous plurality of samples with the contribution of the next sample received and then output the new coefficients. For example, in one embodiment, the apparatus, methods, and computer program products of the present invention initially store each of the samples as they are received and generates a first set of coefficients when the last sample of the plurality of samples has been received. Further, when a new sample of the input signal is received, (after the predetermined plurality of samples has already been received), the apparatus, methods, and computer program products of the present invention apply the mathematical function associated with the coefficients to the new sample and generate a term based on the new sample for each coefficient. To replace the new sample with the first sample of the plurality of the samples, the generated term of the new sample is subtracted from the term associated with the first sample of the predetermined plurality of samples that was previously stored in a memory device. Following this subtraction, the coefficients are updated by the difference between the terms based upon the new sample and the first sample of the predetermined plurality of samples.

In another embodiment of the present invention, to replace the new sample with the first sample of the plurality of samples, the apparatus, method, and computer program products of the present invention subtract the term based upon a first sample of the predetermined plurality of samples from each of the coefficients and adds the term based upon the new sample to each of the coefficients. As such, in one embodiment, the terms for the new and oldest sample are first subtracted from each other and the remainder is added to the coefficients, while in another embodiment, the term associated with the oldest sample is subtracted from each coefficient and the term associated with the new sample is added to the coefficients. This second embodiment typically experiences less computational drift and is illustrated in FIG. 15.

Figure 15:
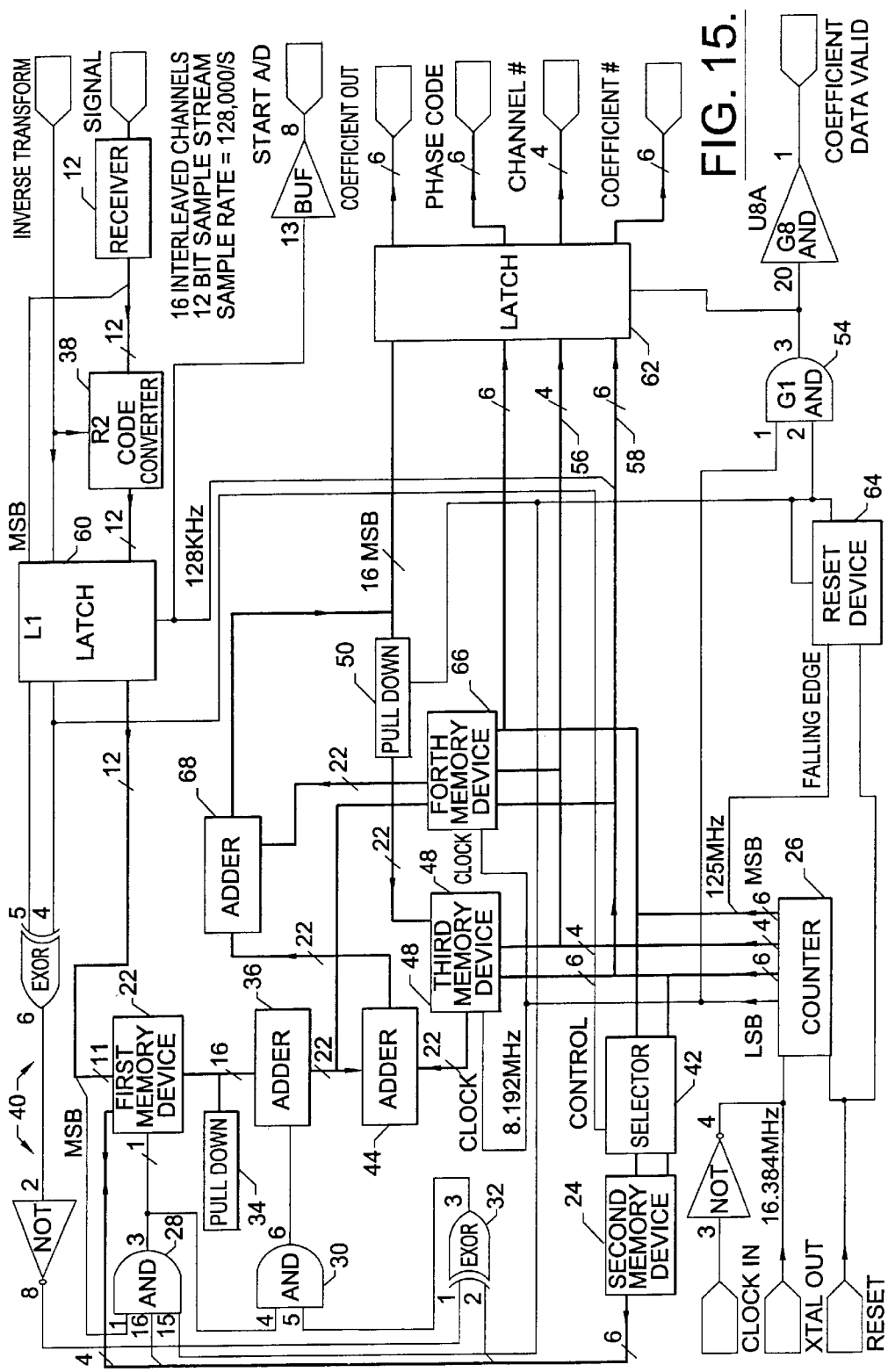
FIG. 15 is a block diagram of an apparatus for determining the coefficients of a function representative of an input signal based on a plurality of samples of the input signal using memory devices and gates, where for each sample received a set of coefficients are output according to one embodiment of the present invention.

Specifically, the coefficient generator 10 of FIG. 15 includes all of the components of the coefficient generator illustrated and described in FIG. 13. However, the coefficient generator of FIG. 15 further includes a forth memory device 66 in electrical communication with the third memory device 48 for storing the terms associated with each sample of a plurality of samples. The coefficient generator further includes an adder 68 in electrical communication with the third and forth memory devices for subtracting the term associated from the first sample of a previous plurality of samples from the term associated with newly received sample.

Figure 16:
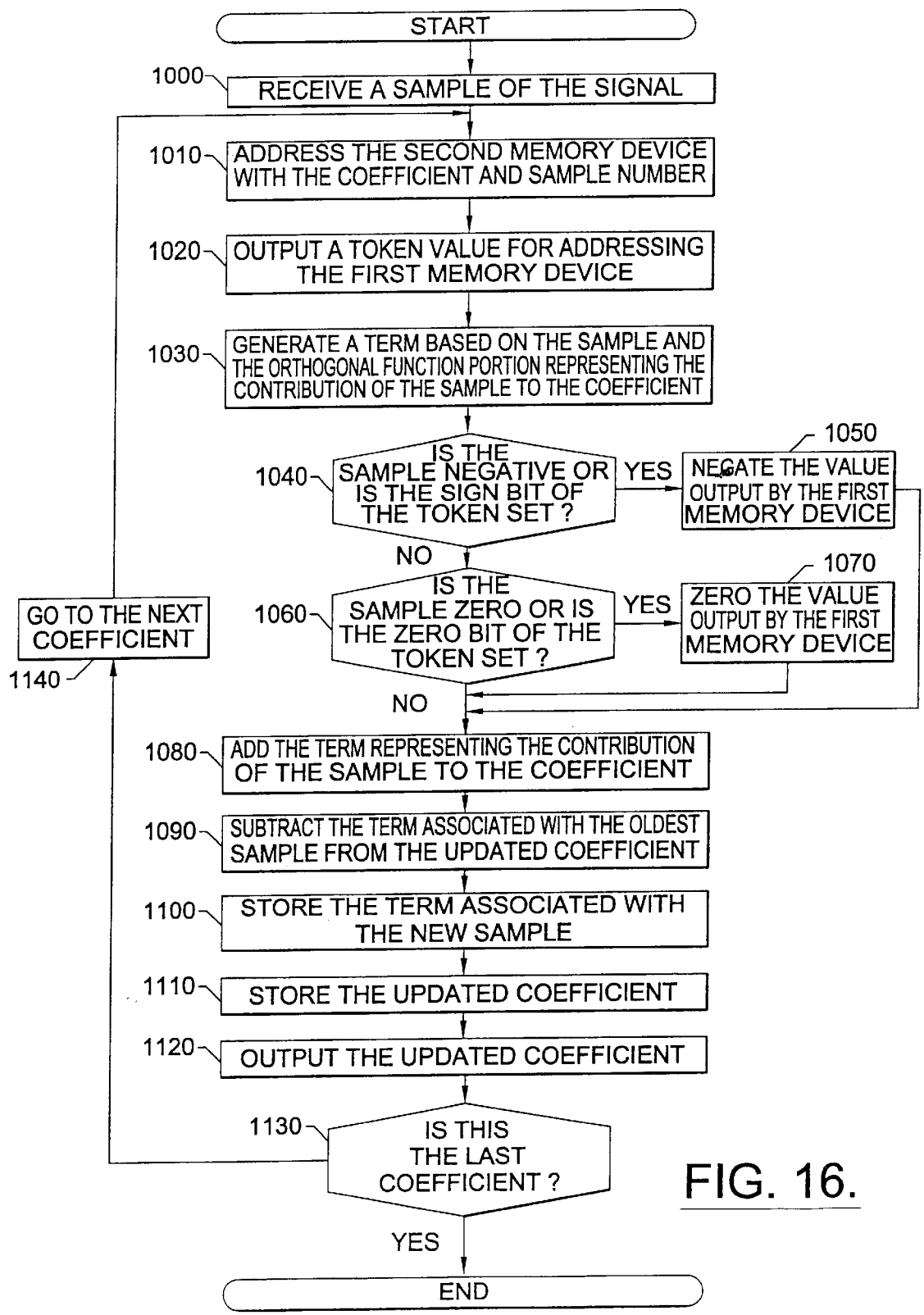
FIG. 16 is a block diagram of the operations performed to determine the coefficients of a function representative of an input signal based on a plurality of samples of the input signal using memory devices and gates, where for each sample received a set of coefficients are output according to one embodiment of the present invention.

With reference to FIG. 16, in operation in this embodiment, similar to previous embodiments, for each sample, the receiver receives a sample of the signal and inputs the sample to the first memory device 22. (See step 1000). For each coefficient, inputs, 18 and 20, are provided to the second memory device representing the sample number and coefficient number, (see step 1010), and based on the inputs, the second memory device outputs a token. (See step 1020). Based on the token and sample, the first memory device generates a term representing the contribution of the sample to the coefficient. (See step 1030).

If either the sign of the signal is negative or the sign bit of the token is set, the second AND gate outputs a carry bit to the adder 36. The adder will make the output of the first memory device negative. (See steps 1040 and 1050). Likewise, if either the signal or the token indicates a zero value, a zero value is output by the first AND gate 28.

The zero value is output to the first memory device, which disables the first memory device. Due to the disablement of the first memory device, the null or pull down device 34 outputs a zero value representing the value of the coefficient. (See steps 1060 and 1070). For the zero case, sign is ignored. The term of the coefficient is then output.

The term is next provided to the adder 44, which also receives the previous value of the coefficient from the third memory device 48. The third memory device is also connected to the second memory device. The token from the second memory device addresses the coefficient stored in the third memory device, which, in turn, is output to the adder for adding to the term. The term is added to the existing coefficient by the adder. (See step 1080).

The forth memory device is also connected to the second memory device. The token from the second memory device addresses the term stored in the forth memory device representing the term associated with the first sample of the plurality of samples, (i.e., the oldest sample). The term is provided to the adder 68, where the term is subtracted from the updated coefficient. (See step 1090). The term associated with the new sample is stored in the forth memory device, (see step 1100), the updated coefficient is stored in the third memory device, (see step 1110), and also output. (See step 1120). The above steps are repeated for each coefficient until all of the coefficients have been updated with the sample. (See steps 1130 and 1140).

As illustrated in some of the embodiments above, the apparatus, methods, and computer program products of the present invention may be used in parallel for a series of channels for which the present invention generates for each channel coefficients of a function representing a signal on the channel. As detailed above, the present invention determines the coefficients of the function representative of signal by combining each sample upon receipt with the mathematical function associated with the sample and the coefficient. Further, as detailed above, the different combinations of the samples and coefficients may be pre-calculated and stored in an addressable memory device or may be computed by a gated function with reference to a value associated with the token. Typically, the tokens that address the cells of the memory device are derived from state information obtained from the counter indicating the coefficient and the sample. While in the normal operation, the tokens and memory device are used to determine the coefficients of a function that is representative of a signal, these tokens and memory devices may also be used repetitively by adding bits to the counter at appropriate locations and thus service a multiplicity of channels. In this embodiment, additional coefficient memory cells maintain the additional coefficients, and a channel number may be output as a convenience to the user. It is still possible employ an electrical signal to determine the forward coefficients or to determine the inverse function of the input.

Further, while in the normal operation, the tokens and memory device are used to determine the coefficients of a function that is representative of a signal, these tokens and memory devices may also be used repetitively by adding bits to the counter at appropriate locations and thus service a multiplicity of channels. In this embodiment, additional coefficient memory cells maintain the additional coefficients, and a channel number may be output as a convenience to the user. By letting consecutive samples be treated as different channels it is possible to thus produce interleaved transforms. The interleaved transforms may be sent to a second similar process to produce two-dimensional transforms, for example.

As detailed above, the apparatus, methods, and computer program products of the present invention are capable of not only determining the coefficients of a function but also the coefficients of an inverse function. This is accomplished in many instances by switching the addresses of the tokens, such that the tokens address the values representing the inverse function. In instances in which the coefficient generator is used with a plurality of channels. The coefficient generator may be advantageously controlled such that for one channel it provides the coefficients of a function representative of one signal, while also providing the coefficients of an inverse function of another signal for a separate channel.

As detailed in the various embodiments illustrated above, the apparatus, methods, and computer program products of the present invention update each coefficient as each sample is received. Further, in some embodiments, the apparatus, methods, and computer program products of the present invention outputs the coefficients each time a new sample is received. This is advantageous as it allows individual coefficients of interest to be observed and tracked. Individual coefficients of interest may be tracked by controlling the coefficient generator to output these coefficients. This provides a user with a new set of coefficients in real or near real-time for observance.

An additional advantage, is that the coefficients can also be updated with different resolutions. Specifically, there may be instances where some of the coefficients are of greater interest or there is limited hardware resources such that not all coefficients can be properly processed and stored. In these instances, the coefficient generator can be controlled to only update certain coefficients or to update some coefficients with each sample, while coefficients of less importance are updated with fewer of the samples.

In addition to providing apparatus and methods, the present invention also provides computer program products for determining the coefficients of a function representative of an input signal based on a predetermined plurality of samples of the input signal. The computer program products have a computer readable storage medium having computer readable program code means embodied in the medium. The computer readable storage medium may replace the coefficient generator and perform the functions of the coefficient generator through software. Further, computer readable storage medium may control the coefficient generator by providing the addresses for determining the coefficients.

The computer-readable program code means includes first computer instruction means for receiving each of the samples one at a time. Further, the computer-readable program code means includes second computer instruction means for updating the coefficients of the function based on each sample as the sample is received without awaiting receipt of all samples to thereby decrease the latency of the time required to determine the coefficients of the function. In a further embodiment, each coefficient is comprised of at least one term that is at least partially based upon a combination of a sample and a mathematical function. In this embodiment, the computer-readable program code means further includes third computer instruction means for determining a respective term of each coefficient by combining each sample upon receipt with the mathematical function associated with the sample and the coefficient. In still another embodiment, the each sample only contributes to one term of each coefficient. In this embodiment, the second computer instruction means updates each of the coefficients based on each sample upon receipt without requiring the sample to thereafter be stored.

The present invention also provides computer program products for reducing the number of values that must be stored to represent the possible mathematical terms of a function. In this embodiment, the computer program products include a computer readable storage medium having computer readable program code means embodied in the medium. The computer-readable program code means includes first computer instruction means for generating a first list of all possible mathematical terms of the function. A second computer instruction means systematically compares each mathematical term in the list to all other mathematical terms in the list to determine which of the mathematical terms are redundant. The computer-readable program code also includes third computer instruction means for storing in a second list all of the unique mathematical terms of the function, such that there are no redundant mathematical terms of the function in the second list.

In one embodiment of the present invention, the function is periodic and symmetrical about zero, such that some of the mathematical terms of the function have the same magnitude and different signs. In this embodiment, the second computer instruction means compares the magnitude of each mathematical term in the list to the magnitude of each of the other mathematical terms in the list to determine which of the mathematical terms have the same magnitude. Further, the third computer instruction means stores in the second list all of the mathematical terms having unique magnitudes. The computer-readable program code means of this embodiment further includes fourth computer instruction means for creating a token associated with each mathematical term, where the token indicates the magnitude stored in the second list associated with the mathematical term and the sign associated with the mathematical term.

In another embodiment, at least one of the mathematical terms has a magnitude of zero. In this embodiment, the computer-readable program code means further includes fourth computer instruction means for creating a token associated with the mathematical term indicating that the mathematical term is zero such that said storing step does not store the mathematical term in the second list.

In some embodiments, the computer-readable program code means further includes fourth computer instruction means for addressing each of the mathematical terms in the second list, such that the mathematical terms may be retrieved. In a further, embodiment, the function is representative of a signal and is defined by samples of the signal, where a sample of the signal is one of a finite number of possible values. In this embodiment, the first computer instruction means generates a first list of all possible combinations of the possible values of the sample and the mathematical terms of the function. Further, the second computer instruction means systematically compares each combination in the list to all other combinations in the list to determine which of the combinations are redundant, and the third computer instruction means stores in a second list all of the unique combinations, such that there are no redundant combinations in the second list.

In addition to providing computer program products that generate the coefficients of a function and computer program products that reduce the number of stored values, the present invention also provides computer program products that generate a circuit design or a computer program that determines the coefficients of a function by updating at least one of the coefficients prior to receipt of the last sample. Specifically, as known in the art, there are computer programs that allow for the input of specified parameters and output circuit designs or computer software to implement the functions defined by the parameters. The present invention provides computer program products that receive parameters concerning the functions to be performed by the system and generates either a circuit design or computer program for implementing the functions. For example, in one embodiment, the computer program product receives all the possible mathematical terms of a function and generates either a circuit or computer program that uses the possible mathematical terms to generate the coefficients of a function with reduced hardware or reduced data storage.

In this regard, FIG. 1–16 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or step s in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Appendix 1

Example of a program evaluating a Standard Fourier Series.

$S1 := 1 \quad S2 := 2 \quad S3 := -1 \quad S4 := 3 \quad S5 := -4 \quad S6 := 1 \quad S7 := 0 \quad S8 := 2$ Evaluate the $A0$ value.

$A0_1 := S1 \quad A0_2 := S2 \quad A0_3 := S3 \quad A0_4 := S4$ $A0_5 := S5 \quad A0_6 := S6 \quad A0_7 := S7 \quad A0_8 := S8$ $A0 := A0_1 + A0_2 + A0_3 + A0_4 + A0_5 + A0_6 + A0_7 + A0_8 \quad A0 = 4$ Evaluate $A1$ $$A1_1 := S1 \cdot \cos\left(\frac{2\cdot\pi\cdot 1\cdot 1}{8}\right) \quad A1_2 := S1 \cdot \cos\left(\frac{2\cdot\pi\cdot 1\cdot 2}{8}\right) \quad A1_3 := S3 \cdot \cos\left(\frac{2\cdot\pi\cdot 1\cdot 3}{8}\right) \quad A1_4 := S4 \cdot \cos\left(\frac{2\cdot\pi\cdot 1\cdot 4}{8}\right)$$

$$A1_5 := S5 \cdot \cos\left(\frac{2\cdot\pi\cdot 1\cdot 5}{8}\right) \quad A1_6 := S6 \cdot \cos\left(\frac{2\cdot\pi\cdot 1\cdot 6}{8}\right) \quad A1_7 := S7 \cdot \cos\left(\frac{2\cdot\pi\cdot 1\cdot 7}{8}\right) \quad A1_8 := S8 \cdot \cos\left(\frac{2\cdot\pi\cdot 1\cdot 8}{8}\right)$$

$$A1 := A1_1 + A1_2 + A1_3 + A1_4 + A1_5 + A1_6 + A1_7 + A1_8 \quad A1 = 3.243$$

Evaluate $A2$ $$A2_1 := S1 \cdot \cos\left(\frac{2\cdot\pi\cdot 2\cdot 1}{8}\right) \quad A2_2 := S2 \cdot \cos\left(\frac{2\cdot\pi\cdot 2\cdot 2}{8}\right) \quad A2_3 := S3 \cdot \cos\left(\frac{2\cdot\pi\cdot 2\cdot 3}{8}\right) \quad A2_4 := S4 \cdot \cos\left(\frac{2\cdot\pi\cdot 2\cdot 4}{8}\right)$$

$$A2_5 := S5 \cdot \cos\left(\frac{2\cdot\pi\cdot 2\cdot 5}{8}\right) \quad A2_6 := S6 \cdot \cos\left(\frac{2\cdot\pi\cdot 2\cdot 6}{8}\right) \quad A2_7 := S7 \cdot \cos\left(\frac{2\cdot\pi\cdot 2\cdot 7}{8}\right) \quad A2_8 := S8 \cdot \cos\left(\frac{2\cdot\pi\cdot 2\cdot 8}{8}\right)$$

$$A2 := A2_1 + A2_2 + A2_3 + A2_4 + A2_5 + A2_6 + A2_7 + A2_8 \quad A2 = 2$$

Evaluate $A3$ $$A3_1 := S1 \cdot \cos\left(\frac{2\cdot\pi\cdot 3\cdot 1}{8}\right) \quad A3_2 := S2 \cdot \cos\left(\frac{2\cdot\pi\cdot 3\cdot 2}{8}\right) \quad A3_3 := S3 \cdot \cos\left(\frac{2\cdot\pi\cdot 3\cdot 3}{8}\right) \quad A3_4 := S4 \cdot \cos\left(\frac{2\cdot\pi\cdot 3\cdot 4}{8}\right)$$

$$A3_5 := S5 \cdot \cos\left(\frac{2\cdot\pi\cdot 3\cdot 5}{8}\right) \quad A3_6 := S6 \cdot \cos\left(\frac{2\cdot\pi\cdot 3\cdot 6}{8}\right) \quad A3_7 := S7 \cdot \cos\left(\frac{2\cdot\pi\cdot 3\cdot 7}{8}\right) \quad A3_8 := S8 \cdot \cos\left(\frac{2\cdot\pi\cdot 3\cdot 8}{8}\right)$$

$$A3 := A3_1 + A3_2 + A3_3 + A3_4 + A3_5 + A3_6 + A3_7 + A3_8 \quad A3 = -5.243$$

Evaluate $A4$ $$A4_1 := S1 \cdot \cos\left(\frac{2\cdot\pi\cdot 4\cdot 1}{8}\right) \quad A4_2 := S2 \cdot \cos\left(\frac{2\cdot\pi\cdot 4\cdot 2}{8}\right) \quad A4_3 := S3 \cdot \cos\left(\frac{2\cdot\pi\cdot 4\cdot 3}{8}\right) \quad A4_4 := S4 \cdot \cos\left(\frac{2\cdot\pi\cdot 4\cdot 4}{8}\right)$$

$$A4_5 := S5 \cdot \cos\left(\frac{2\cdot\pi\cdot 4\cdot 5}{8}\right) \quad A4_6 := S6 \cdot \cos\left(\frac{2\cdot\pi\cdot 4\cdot 6}{8}\right) \quad A4_7 := S7 \cdot \cos\left(\frac{2\cdot\pi\cdot 4\cdot 7}{8}\right) \quad A4_8 := S8 \cdot \cos\left(\frac{2\cdot\pi\cdot 4\cdot 8}{8}\right)$$

$$A4 := A4_1 + A4_2 + A4_3 + A4_4 + A4_5 + A4_6 + A4_7 + A4_8 \quad A4 = 12$$

Evaluate $B1$ $$B1_1 := S1 \cdot \sin\left(\frac{2\cdot\pi\cdot 1\cdot 1}{8}\right) \quad B1_2 := S2 \cdot \sin\left(\frac{2\cdot\pi\cdot 1\cdot 2}{8}\right) \quad B1_3 := S3 \cdot \sin\left(\frac{2\cdot\pi\cdot 1\cdot 3}{8}\right) \quad B1_4 := S4 \cdot \sin\left(\frac{2\cdot\pi\cdot 1\cdot 4}{8}\right)$$

$$B1_5 := S5 \cdot \sin\left(\frac{2\cdot\pi\cdot 1\cdot 5}{8}\right) \quad B1_6 := S6 \cdot \sin\left(\frac{2\cdot\pi\cdot 1\cdot 6}{8}\right) \quad B1_7 := S7 \cdot \sin\left(\frac{2\cdot\pi\cdot 1\cdot 7}{8}\right) \quad B1_8 := S8 \cdot \sin\left(\frac{2\cdot\pi\cdot 1\cdot 8}{8}\right)$$

$$B1 := B1_1 + B1_2 + B1_3 + B1_4 + B1_5 + B1_6 + B1_7 + B1_8 \quad B1 = 3.828$$

Evaluate $B2$ $$B2_1 := S1 \cdot \sin\left(\frac{2\cdot\pi\cdot 2\cdot 1}{8}\right) \quad B2_2 := S2 \cdot \sin\left(\frac{2\cdot\pi\cdot 2\cdot 2}{8}\right) \quad B2_3 := S3 \cdot \sin\left(\frac{2\cdot\pi\cdot 2\cdot 3}{8}\right) \quad B2_4 := S4 \cdot \sin\left(\frac{2\cdot\pi\cdot 2\cdot 4}{8}\right)$$

$$B2_5 := S5 \cdot \sin\left(\frac{2\cdot\pi\cdot 2\cdot 5}{8}\right) \quad B2_6 := S6 \cdot \sin\left(\frac{2\cdot\pi\cdot 2\cdot 6}{8}\right) \quad B2_7 := S7 \cdot \sin\left(\frac{2\cdot\pi\cdot 2\cdot 7}{8}\right) \quad B2_8 := S8 \cdot \sin\left(\frac{2\cdot\pi\cdot 2\cdot 8}{8}\right)$$

$$B2 := B2_1 + B2_2 + B2_3 + B2_4 + B2_5 + B2_6 + B2_7 + B2_8 \quad B2 = -2$$

Evaluate $B3$ $$B3_1 := S1 \cdot \sin\left(\frac{2\cdot\pi\cdot 3\cdot 1}{8}\right) \quad B3_2 := S2 \cdot \sin\left(\frac{2\cdot\pi\cdot 3\cdot 2}{8}\right) \quad B3_3 := S3 \cdot \sin\left(\frac{2\cdot\pi\cdot 3\cdot 3}{8}\right) \quad B3_4 := S4 \cdot \sin\left(\frac{2\cdot\pi\cdot 3\cdot 4}{8}\right)$$

$$B3_5 := S5 \cdot \sin\left(\frac{2\cdot\pi\cdot 3\cdot 5}{8}\right) \quad B3_6 := S6 \cdot \sin\left(\frac{2\cdot\pi\cdot 3\cdot 6}{8}\right) \quad B3_7 := S7 \cdot \sin\left(\frac{2\cdot\pi\cdot 3\cdot 7}{8}\right) \quad B3_8 := S8 \cdot \sin\left(\frac{2\cdot\pi\cdot 3\cdot 8}{8}\right)$$

-continued $$B3 := B3_1 + B3_2 + B3_3 + B3_4 + B3_5 + B3_6 + B3_7 + B3_8 \quad B3 = 1.828$$

Evaluate $B4$, All terms are zero for any even number of samples.

$$B4_1 := S1 \cdot \sin\left(\frac{2 \cdot \pi \cdot 4 \cdot 1}{8}\right) \quad B4_2 := S2 \cdot \sin\left(\frac{2 \cdot \pi \cdot 4 \cdot 2}{8}\right) \quad B4_3 := S3 \cdot \sin\left(\frac{2 \cdot \pi \cdot 4 \cdot 3}{8}\right) \quad B4_4 := S4 \cdot \sin\left(\frac{2 \cdot \pi \cdot 4 \cdot 4}{8}\right)$$

$$B4_5 := S5 \cdot \sin\left(\frac{2 \cdot \pi \cdot 4 \cdot 5}{8}\right) \quad B4_6 := S6 \cdot \sin\left(\frac{2 \cdot \pi \cdot 4 \cdot 6}{8}\right) \quad B4_7 := S7 \cdot \sin\left(\frac{2 \cdot \pi \cdot 4 \cdot 7}{8}\right) \quad B4_8 := S8 \cdot \sin\left(\frac{2 \cdot \pi \cdot 4 \cdot 8}{8}\right)$$

$$B4 := B4_1 + B4_2 + B4_3 + B4_4 + B4_5 + B4_6 + B4_7 + B4_8 \quad B4 = -7.348 \cdot 10^{15}$$

Adjusting the classical coefficients to the forms used:

DC value $= A0/N \quad ADC := \dfrac{A0}{8}$

Truncation Value: Divide $A4$ by 2. $\quad A4T := \dfrac{A4}{2}$

Which gives the Fourier Transform:

$ADC = 0.5 \quad A1 = 3.243 \quad A2 = 2 \quad A3 = -5.243 \quad A4T = 6$ $B1 = 3.828 \quad B2 = -2 \quad B3 = 1.828$ $$FT : \begin{bmatrix} A1 & A2 & A3 & A4T \\ B1 & B2 & B3 & ADC \end{bmatrix}$$

-continued $$FT = \begin{bmatrix} 3.243 & 2 & -5.243 & 6 \\ 3.828 & -2 & 1.828 & 0.5 \end{bmatrix}$$

Appendix 2

Example of a program evaluating a Fast Fourier Series according to one embodiment of the present invention. All computations are done on a sample-by-sample basis with one register dedicated to each coefficient and being updated with each successive sample.

$S1 := 1$ On arrival of the first sample all coefficients are processed with respect to it.

$A01 := S1$ $$A11 := S1 \cdot \cos\left(\frac{2 \cdot \pi \cdot 1 \cdot 1}{8}\right) \quad A21 := S1 \cdot \cos\left(\frac{2 \cdot \pi \cdot 2 \cdot 1}{8}\right) \quad A31 := S1 \cdot \cos\left(\frac{2 \cdot \pi \cdot 3 \cdot 1}{8}\right) \quad A41 := S1 \cdot \cos\left(\frac{2 \cdot \pi \cdot 4 \cdot 1}{8}\right)$$

$$B11 := S1 \cdot \sin\left(\frac{2 \cdot \pi \cdot 1 \cdot 1}{8}\right) \quad B21 := S1 \cdot \sin\left(\frac{2 \cdot \pi \cdot 2 \cdot 1}{8}\right) \quad B31 := S1 \cdot \sin\left(\frac{2 \cdot \pi \cdot 3 \cdot 1}{8}\right) \quad B41 := S1 \cdot \sin\left(\frac{2 \cdot \pi \cdot 4 \cdot 1}{8}\right)$$

$S2 := 2$ On arrival of the second sample all coefficients are updated with it.

$A02 := S2$ $$A12 := S2 \cdot \cos\left(\frac{2 \cdot \pi \cdot 1 \cdot 2}{8}\right) \quad A22 := S2 \cdot \cos\left(\frac{2 \cdot \pi \cdot 2 \cdot 2}{8}\right) \quad A32 := S2 \cdot \cos\left(\frac{2 \cdot \pi \cdot 3 \cdot 2}{8}\right) \quad A42 := S2 \cdot \cos\left(\frac{2 \cdot \pi \cdot 4 \cdot 2}{8}\right)$$

$$B12 := S2 \cdot \sin\left(\frac{2 \cdot \pi \cdot 1 \cdot 2}{8}\right) \quad B22 := S2 \cdot \sin\left(\frac{2 \cdot \pi \cdot 2 \cdot 2}{8}\right) \quad B32 := S1 \cdot \sin\left(\frac{2 \cdot \pi \cdot 3 \cdot 2}{8}\right) \quad B42 := S2 \cdot \sin\left(\frac{2 \cdot \pi \cdot 4 \cdot 2}{8}\right)$$

$A0_{12} := A01 + A02$ $A1_{12} := A11 + A12 \quad\quad A2_{12} := A21 + A22 \quad\quad A3_{12} := A31 + A32 \quad\quad A4_{12} := A41 + A42$ $B1_{12} := B11 + B12 \quad\quad B2_{12} := B21 + B22 \quad\quad B3_{12} := B31 + B32 \quad\quad B4_{12} := B41 + B42$ $S3 := -1$ On arrival of the third sample all coefficients are updated with it.

$A03 := S3$

-continued $A13 := S3 \cdot \cos\left(\frac{2 \cdot \pi \cdot 1 \cdot 3}{8}\right) \quad A23 := S3 \cdot \cos\left(\frac{2 \cdot \pi \cdot 2 \cdot 3}{8}\right) \quad A33 := S3 \cdot \cos\left(\frac{2 \cdot \pi \cdot 3 \cdot 3}{8}\right) \quad A43 := S3 \cdot \cos\left(\frac{2 \cdot \pi \cdot 4 \cdot 3}{8}\right)$ $B13 := S3 \cdot \sin\left(\frac{2 \cdot \pi \cdot 1 \cdot 3}{8}\right) \quad B23 := S3 \cdot \sin\left(\frac{2 \cdot \pi \cdot 2 \cdot 3}{8}\right) \quad B33 := S3 \cdot \sin\left(\frac{2 \cdot \pi \cdot 3 \cdot 3}{8}\right) \quad B43 := S3 \cdot \sin\left(\frac{2 \cdot \pi \cdot 4 \cdot 3}{8}\right)$ $A0_{13} := A0_{12} + A03$ $A1_{13} := A1_{12} + A13 \quad A2_{13} := A2_{12} + A23 \quad A3_{13} := A3_{12} + A33 \quad A4_{13} := A4_{12} + A43$ $B1_{13} := B1_{12} + B13 \quad B2_{13} := B2_{12} + B23 \quad B3_{13} := B3_{12} + B33 \quad B4_{13} := B4_{12} + B43$ $S4: = 3$ On arrival of the fourth sample all coefficients are updated with it.

$A04 := S4$ $A14 := S4 \cdot \cos\left(\frac{2 \cdot \pi \cdot 1 \cdot 4}{8}\right) \quad A24 := S4 \cdot \cos\left(\frac{2 \cdot \pi \cdot 2 \cdot 4}{8}\right) \quad A34 := S4 \cdot \cos\left(\frac{2 \cdot \pi \cdot 3 \cdot 4}{8}\right) \quad A44 := S4 \cdot \cos\left(\frac{2 \cdot \pi \cdot 4 \cdot 4}{8}\right)$ $B14 := S4 \cdot \sin\left(\frac{2 \cdot \pi \cdot 1 \cdot 4}{8}\right) \quad B24 := S4 \cdot \sin\left(\frac{2 \cdot \pi \cdot 2 \cdot 4}{8}\right) \quad B34 := S4 \cdot \sin\left(\frac{2 \cdot \pi \cdot 3 \cdot 4}{8}\right) \quad B44 := S4 \cdot \sin\left(\frac{2 \cdot \pi \cdot 4 \cdot 4}{8}\right)$ $A0_{14}: = A0_{13} + A04$ $A1_{14}: = A1_{13} + A14 \quad A2_{14}: = A2_{13} + A24 \quad A3_{14}: = A3_{13} + A34 \quad A4_{14}: = A4_{13} + A44$ $B1_{14}: = B1_{13} + B14 \quad B2_{14}: = B2_{13} + B24 \quad B3_{14}: = B3_{13} + B34 \quad B4_{14}: = B4_{13} + B44$ $S5: = -4$ On arrival of the fifth sample all coefficients are updated with it.

$A05: = S5$ $A15 := S5 \cdot \cos\left(\frac{2 \cdot \pi \cdot 1 \cdot 5}{8}\right) \quad A25 := S5 \cdot \cos\left(\frac{2 \cdot \pi \cdot 2 \cdot 5}{8}\right) \quad A35 := S5 \cdot \cos\left(\frac{2 \cdot \pi \cdot 3 \cdot 5}{8}\right) \quad A45 := S5 \cdot \cos\left(\frac{2 \cdot \pi \cdot 4 \cdot 5}{8}\right)$ $B15 := S4 \cdot \sin\left(\frac{2 \cdot \pi \cdot 1 \cdot 5}{8}\right) \quad B25 := S5 \cdot \sin\left(\frac{2 \cdot \pi \cdot 2 \cdot 5}{8}\right) \quad B35 := S5 \cdot \sin\left(\frac{2 \cdot \pi \cdot 3 \cdot 5}{8}\right) \quad B45 := S5 \cdot \sin\left(\frac{2 \cdot \pi \cdot 4 \cdot 5}{8}\right)$ $A0_{15}: = A0_{14} + A05$ $A1_{15}: = A1_{14} + A15 \quad A2_{15}: = A2_{14} + A25 \quad A3_{15}: = A3_{14} + A35 \quad A4_{15}: = A4_{14} + A45$ $B1_{15}: = B1_{14} + B15 \quad B2_{15}: = B2_{14} + B25 \quad B3_{15}: = B3_{14} + B35 \quad B4_{15}: = B4_{14} + B45$ $S6: = 1$ On arrival of the sixth sample all coefficients are updated with it.

$A06: = S6$ $A16 := S6 \cdot \cos\left(\frac{2 \cdot \pi \cdot 1 \cdot 6}{8}\right) \quad A26 := S6 \cdot \cos\left(\frac{2 \cdot \pi \cdot 2 \cdot 6}{8}\right) \quad A36 := S6 \cdot \cos\left(\frac{2 \cdot \pi \cdot 3 \cdot 6}{8}\right) \quad A46 := S6 \cdot \cos\left(\frac{2 \cdot \pi \cdot 4 \cdot 6}{8}\right)$ $B16 := S6 \cdot \sin\left(\frac{2 \cdot \pi \cdot 1 \cdot 6}{8}\right) \quad B26 := S6 \cdot \sin\left(\frac{2 \cdot \pi \cdot 2 \cdot 6}{8}\right) \quad B36 := S6 \cdot \sin\left(\frac{2 \cdot \pi \cdot 3 \cdot 6}{8}\right) \quad B46 := S6 \cdot \sin\left(\frac{2 \cdot \pi \cdot 4 \cdot 6}{8}\right)$ $A0_{16}: = A0_{15} + A06$ $A1_{16}: = A1_{15} + A16 \quad A2_{16}: = A2_{15} + A26 \quad A3_{16}: = A3_{15} + A36 \quad A4_{16}: = A4_{15} + A46$ $B1_{16}: = B1_{15} + B16 \quad B2_{16}: = B2_{15} + B26 \quad B3_{16}: = B3_{15} + B36 \quad B4_{16}: = B4_{15} + B46$ $S7: = 0$ On arrival of the seventh sample all coefficients are updated with it.

$A07: = S7$ $A17 := S7 \cdot \cos\left(\frac{2 \cdot \pi \cdot 1 \cdot 7}{8}\right) \quad A27 := S7 \cdot \cos\left(\frac{2 \cdot \pi \cdot 2 \cdot 7}{8}\right) \quad A37 := S7 \cdot \cos\left(\frac{2 \cdot \pi \cdot 3 \cdot 7}{8}\right) \quad A47 := S7 \cdot \cos\left(\frac{2 \cdot \pi \cdot 4 \cdot 7}{8}\right)$ $B17 := S7 \cdot \sin\left(\frac{2 \cdot \pi \cdot 1 \cdot 7}{8}\right) \quad B27 := S7 \cdot \sin\left(\frac{2 \cdot \pi \cdot 2 \cdot 7}{8}\right) \quad B37 := S7 \cdot \sin\left(\frac{2 \cdot \pi \cdot 3 \cdot 7}{8}\right) \quad B47 := S7 \cdot \sin\left(\frac{2 \cdot \pi \cdot 4 \cdot 7}{8}\right)$ $A0_{17}: = A0_{16} + A07$ $A1_{17}: = A1_{16} + A17 \quad A2_{17}: = A2_{16} + A27 \quad A3_{17}: = A3_{16} + A37 \quad A4_{17}: = A4_{16} + A47$ -continued $B1_{17} := B1_{16} + B17 \quad B2_{17} := B2_{16} + B27 \quad B3_{17} := B3_{16} + B37 \quad B4_{17} := B4_{16} + B47$ $S8: = 2$ On arrival of the eigth sample all coefficients become complete in a single update.

The subscript "F" is used rather than 18 to designate final coefficients.

$A08 := S8$ $A18 := S8 \cdot \cos\left(\frac{2 \cdot \pi \cdot 1 \cdot 8}{8}\right) \quad A28 := S8 \cdot \cos\left(\frac{2 \cdot \pi \cdot 2 \cdot 8}{8}\right) \quad A38 := S8 \cdot \cos\left(\frac{2 \cdot \pi \cdot 3 \cdot 8}{8}\right) \quad A48 := S8 \cdot \cos\left(\frac{2 \cdot \pi \cdot 4 \cdot 8}{8}\right)$ $B18 := S8 \cdot \sin\left(\frac{2 \cdot \pi \cdot 1 \cdot 8}{8}\right) \quad B28 := S8 \cdot \sin\left(\frac{2 \cdot \pi \cdot 2 \cdot 8}{8}\right) \quad B38 := S8 \cdot \sin\left(\frac{2 \cdot \pi \cdot 3 \cdot 8}{8}\right) \quad B48 := S8 \cdot \sin\left(\frac{2 \cdot \pi \cdot 4 \cdot 8}{8}\right)$ $F := 18 \qquad A0_F := A0_{17} + A08$ $A1_F := A1_{17} + A18 \quad A2_F := A2_{17} + A28 \quad A3_F := A3_{17} + A38 \quad A4_F := A4_{17} + A48$ $B1_F := B1_{17} + B18 \quad B2_F := B2_{17} + B28 \quad B3_F := B3_{17} + B38 \quad B4_F := B4_{17} + B48$ Adjusting the classical coefficients to the forms used:

DC value $= A0/N \qquad ADC := \frac{A0_F}{8}$

Truncation Value: Divide $A4$ by 2. $\quad A4T := \frac{A4_F}{2}$ $B4F = 0$ (Identity for any even number of samples.)

The resulting Fast Fourier Transform is thus evaluated:

$ADC = 0.5 \quad A1_F = 3.243 \quad A2_F = 2 \quad A3_F = -5.243 \quad A4T = 6$
$\qquad B1_F = 3.828 \quad B2_F = -2 \quad B3_F = 1.828$ An array is designated for the transform values:

$FT := \begin{bmatrix} A1_F & A2_F & A3_F & A4T \\ B1_F & B2_F & B3_F & ADC \end{bmatrix}$ The values are displayed:

$FT = \begin{bmatrix} 3.243 & 2 & -5.243 & 6 \\ 3.828 & -2 & 1.828 & 0.5 \end{bmatrix}$ The complete set of incremental values are listed below:

| | | | | |
|---|---|---|---|---|
| A01 = 1 | A11 = 0.707 | A21 = 0 | A31 = −0.707 | A41 = −1 |
| | B11 = 0.707 | B21 = 1 | B31 = 0.707 | B41 = 0 |
| A02 = 2 | A12 | A22 = −2 | A32 = 0 | A42 = 2 |
| | B12 = 2 | B22 = 0 | B32 = −2 | B42 = 0 |
| A03 = −1 | A13 = 0.707 | A23 = 0 | A33 = −0.707 | A43 = 1 |
| | B13 = −0.707 | B23 = 1 | B33 = −0.707 | B43 = 0 |
| A04 = 3 | A14 = −3 | A24 = 3 | A34 = −3 | A44 = 3 |
| | B14 = 0 | B24 = 0 | B34 = $1.1 \cdot 10^{-15}$ | B44 = $-1.47 \cdot 10^{-15}$ |
| A05 = −4 | A15 = 2.828 | A25 = $-1.225 \cdot 10^{-15}$ | A35 = −2.828 | A45 = 4 |
| | B15 = 2.828 | B25 = −4 | B35 = 2.828 | B45 = $-2.449 \cdot 10^{-15}$ |
| A06 = 1 | A16 = 0 | A26 = −1 | A36 = 0 | A46 = 1 |
| | B16 = −1 | B26 = 0 | B36 = 1 | B46 = 0 |
| A07 = 0 | A17 = 0 | A27 = 0 | A37 = 0 | A47 = 0 |
| | B17 = 0 | B27 = 0 | B37 = 0 | B47 = 0 |
| A08 = 2 | A18 = 2 | A28 = 2 | A38 = 2 | A48 = 2 |
| | B18 = 0 | B28 = 0 | B38 = $-1.47 \cdot 10^{-15}$ | B48 = $-1.959 \cdot 10^{-15}$. |

What is claimed is:

1. An apparatus for determining coefficients of a function representative of an input signal based on a predetermined plurality of samples of the input signal, wherein said apparatus comprises:

a coefficient generator; and
a first memory device having an array of cells,
wherein each sample of the signal has a value that is one of a finite number of possible values, and wherein each coefficient is comprised of at least one term that is at least partially based upon a combination of a sample and a mathematical function,
wherein each cell of said array of said memory device is associated with a respective sample and coefficient, wherein each cell contains a pre-calculated value corresponding to the combination of one of the finite number of possible values of the sample and the mathematical function associated with the respective coefficient and sample, and wherein each cell is represented by a token address,
wherein for each term of each coefficient said coefficient generator receives a sample, determines the finite value of the sample, retrieves the pre-calculated value for the term from said memory using the token address associated with the finite value of the sample and the coefficient, and updates the coefficient by adding the respective term to a previous value of the coefficient, and
wherein said coefficient generator updates at least one of the coefficients prior to receipt of the last sample of the plurality of samples to thereby decrease the latency of the time required to determine the coefficients of the function.

2. An apparatus according to claim 1, wherein said coefficient generator further comprises a second memory device having an array of cells for storing tokens that each represent a respective coefficient and sample, and wherein for each sample said coefficient generator accesses said second memory device and for each coefficient retrieves the token associated with the coefficient and the sample and supplies the token to said first memory device, and thereafter retrieves the pre-calculated value stored in the cell of said first memory device that has an address comprised of the token and the value of the sample, and wherein said coefficient generator updates the coefficient by adding the pre-calculated value from said first memory device to the previous value of the coefficient.

3. An apparatus according to claim 1 further comprising at least one gate in electrical communication with said coefficient generator for addressing the cells of said first memory device, wherein for each sample said gate outputs the token associated with the coefficient and the sample to said first memory device, and wherein said coefficient generator retrieves the pre-calculated value stored in the cell of said first memory device that has an address comprised of the token and the value of the sample, and wherein said coefficient generator updates the coefficient by adding the pre-calculated value from said first memory device to the previous value of the coefficient.

4. An apparatus according to claim 3, wherein each token represents a respective coefficient and sample, wherein said coefficient generator further includes a selector in electrical communication with said first memory device and said gates, wherein to generate coefficients representing an inverse function of the signal, said selector switches the output of said gate such that the token generated by said gate addresses a cell in said first memory device containing a pre-calculated value representing an inverse mathematical function associated with a respective sample and coefficient, and wherein said coefficient generator updates the coefficient by adding the pre-calculated value from said first memory device to the previous value of the coefficient.

5. An apparatus according to claim 4, wherein said coefficient generator receives samples one at a time from a plurality of signals each present on a separate channel, wherein said coefficient generator receives each of the samples one at a time for each of the signals and based on the tokens from said gate updates the coefficients of the function associated with each sample based on each sample associated with the signal as the sample is received, wherein said selector switches the output of said gate for the samples received from at least on of the channels, such that said coefficient generator generates coefficients representing an inverse function of the signal for at least one channel.

6. An apparatus according to claim 1 further comprising a counter in electrical communication with said coefficient generator for addressing the cells of the said first memory device, wherein for each sample said counter outputs the token associated with the coefficient and the sample to said first memory device, and wherein said coefficient generator retrieves the pre-calculated value stored in the cell of said first memory device that has an address comprised of the token and the value of the sample, and wherein said coefficient generator updates the coefficient by adding the pre-calculated value from said first memory device to the previous value of the coefficient.

7. An apparatus according to claim 1, wherein each token also indicates if the value of the mathematical function associated with the respective sample and coefficient is zero, wherein said coefficient generator further includes a null device, and wherein if the token indicates that the value of the mathematical function is zero said coefficient generator updates the coefficient by adding a zero from said null device to the previous value of the coefficient.

8. An apparatus according to claim 1, wherein each token also indicates if the sign of the mathematical function associated with the respective sample and coefficient is positive or negative, wherein said first memory device contains only pre-calculated values corresponding to the combination of a respective sample and the magnitude of a respective mathematical function without accounting for the sign of the mathematical function, thereby reducing the number of pre-calculated values that are stored by said first memory device.

9. An apparatus according to claim 8, wherein said coefficient generator further includes an adder in electrical communication with said first memory device, and wherein if said token indicates that the sign of the mathematical function is negative, said first memory device outputs the magnitude of the mathematical function and said adder receives the output and generates a negative of the mathematical function.

10. A method for determining the coefficients of a function representative of an input signal based on a predetermined plurality of samples of the input signal, wherein said method comprises the steps of:

storing in a first memory device having an array of cells pre-calculated values, wherein each coefficient is comprised of at least one term that is at least partially based upon a combination of a sample and a mathematical function, wherein each sample of the signal has a value that is one of a finite number of possible values, wherein said storing step comprises storing in the first memory device a pre-calculated value corresponding to the combination of one of the finite number of possible values of the sample and the mathematical function associated with each coefficient and sample such that each cell is associated with a respective sample, coefficient, and finite value of the sample, and wherein each sell is represented by a token address;

receiving samples of the signal;

determining the finite value of the sample; and updating the coefficients of the function based on each sample, wherein for each term of each coefficient said updating step retrieves the pre-calculated value for the term from the memory using the token address associated with the finite value of the sample and the coefficient, and updates the coefficient by adding the respective term to a previous value of the coefficient, and wherein said updating step updates at least one of the coefficients prior to receipt of the last sample of the plurality of samples to thereby decrease the latency of the time required to determine the coefficients of the function.

11. A method according to claim 10, wherein said method further comprises the step of storing in a second memory device having an array of cells tokens that each represent a respective coefficient and sample, wherein for each sample said determining step accesses the second memory device and for each coefficient retrieves the token associated with the coefficient and the sample and supplies the token to the first memory device, and thereafter retrieves the pre-calculated value stored in the cell of the first memory device that has an address comprised of the token and the value of the sample, and wherein said updating step updates the coefficient by adding the pre-calculated value from the first memory device to the previous value of the coefficient.

12. A method according to claim 10, further comprising the step of addressing the cells of the first memory device, wherein for each sample said addressing step outputs the token associated with the coefficient and the sample to the first memory device, and wherein said determining step retrieves the pre-calculated value stored in the cell of the first memory device that has an address comprised of the token and the value of the sample, and wherein said updating step updates the coefficient by adding the pre-calculated value from the first memory device to the previous value of the coefficient.

13. A method according to claim 10, wherein each token also indicates if the value of the mathematical function associated with the respective sample and coefficient is zero, and wherein said updating step updates the coefficient by adding a zero to the previous value of the coefficient if the token indicated that the value of the mathematical function is zero.

14. A method according to claim 10, wherein each token also indicates if the sign of the mathematical function associated with the respective sample and coefficient is positive or negative, wherein said storing in the first memory device step comprises storing only pre-calculated values corresponding to the combination of a respective sample and the magnitude of a respective mathematical function without accounting for the sign of the mathematical function, thereby reducing the number of pre-calculated values that are stored by the first memory device.

15. A method according to claim 10, and wherein each token represents a respective coefficient and sample, wherein said method further comprises the step of selecting the tokens, wherein to generate coefficients representing an inverse function of the signal, said selecting step switches the contents of the token such that the token addresses a cell in the first memory device containing a pre-calculated value representing an inverse mathematical function associated with a respective sample and coefficient, and wherein said updating step updates the coefficient by adding the pre-calculated value from the first memory device to the previous value of the coefficient.

16. A method according to claim 15, wherein said receiving step receives samples one at a time from a plurality of signals each present on a separate channel, wherein said determining step receives each of the samples one at a time for each of the signals and based on the tokens from said selecting step updates the coefficients of the function associated with each sample based on each sample associated with the signal as the sample is received, wherein said selecting step switches the tokens for the samples received from at least on of the channels, such that said determining step generates coefficients representing an inverse function of the signal for at least one channel.

17. An apparatus for determining the coefficients of a function for a given input signal based on a sample of the input signal, wherein each coefficient is comprised of at least one term that is at least partially based upon a combination of the sample and a mathematical function, wherein said apparatus comprises:
 a first memory device for storing a value representing the mathematical function associated with the sample and each coefficient; and
 a coefficient generator in electrical communication with said memory device, wherein said coefficient generator receives the sample of the input signal and for each coefficient accesses said first memory device and multiplies the sample by the value representing the mathematical function associated with the sample and coefficient to thereby define a term, and thereafter updates the coefficient by adding the term to the previous value of the coefficient,
 wherein the sample of the input signal has a value that is one of a finite number of possible values, wherein said first memory device has an array of cells with each cell associated with the sample and each coefficient, wherein each cell contains a pre-calculated value corresponding to the combination of one of the finite number of possible values of the sample and the mathematical function associated with the respective coefficient, wherein said coefficient generator further comprises a second memory device having an array of cells for storing tokens that each represent a respective coefficient and the sample, and wherein for each sample said coefficient generator accesses said second memory device and retrieves the token associated with the coefficient and the sample and supplies the token to said first memory device, and thereafter retrieves the pre-calculated value stored in the cell of said first memory device that has an address comprised of the token and the value of the sample, and wherein said coefficient generator updates the coefficient by adding the pre-calculated value from said first memory device to the previous value of the coefficient.

18. An apparatus according to claim 17, wherein each token also indicates if the value of the mathematical function associated with the sample and respective coefficient is zero, and wherein said coefficient generator updates the coefficient by adding a zero to the previous value of the coefficient.

19. An apparatus according to claim 17, wherein each token also indicates if the sign of the mathematical function associated with the respective sample and coefficient is positive or negative, wherein said first memory device contains only pre-calculated values corresponding to the combination of a respective sample and the magnitude of a respective mathematical function without accounting for the sign of the mathematical function, thereby reducing the number of pre-calculated values that are stored by said first memory device.

20. A method for determining the coefficients of a function for a given input signal based on a sample of the input signal, wherein each coefficient is comprised of at least one term that is at least partially based upon a combination of the sample and a mathematical function, wherein said method comprises:
 storing a value representing the mathematical function associated with the sample and each coefficient in a first memory device;
 receiving the sample of the input signal;
 determining a respective term of each coefficient by accessing the first memory device, multiplying the sample by the value representing the mathematical function associated with the sample and coefficient to thereby define a term; and
 updating each coefficient by adding the respective term to the previous value of the coefficient
 wherein the sample of the input signal has a value that is one of a finite number of possible values, wherein said storing step comprises storing in a first memory device having an array of cells a pre-calculated value corresponding to the combination of one of the finite number of possible values of the sample and the mathematical function associated with each coefficient such that each cell contains a pre-calculated value corresponding to the combination of one of the finite number of possible values of the sample and the mathematical function associated with the respective coefficient, wherein said method further comprises storing tokens that each represent a respective coefficient and the sample in a second memory device having an array of cells, and wherein for each sample said determining step accesses the second memory device and retrieves the token associated with the coefficient and the sample and supplies the token to the first memory device, and thereafter retrieves the pre-calculated value stored in the cell of the first memory device that has an address comprised of the token and the value of the sample, and wherein said updating step updates the coefficient by adding the pre-calculated value from the first memory device to the previous value of the coefficient.

21. A method according to claim 20, wherein each token also indicates if the value of the mathematical function associated with the respective sample and coefficient is zero, and wherein said updating step updates the coefficient by adding a zero to the previous value of the coefficient if the token indicated that the value of the mathematical function is zero.

22. A method according to claim 20, wherein each token also indicates if the sign of the mathematical function associated with the respective sample and coefficient is positive or negative, wherein said storing in the first memory device step comprises storing only pre-calculated values corresponding to the combination of a respective sample and the magnitude of a respective mathematical function without accounting for the sign of the mathematical function, thereby reducing the number of pre-calculated values that are stored by the first memory device.

23. A computer program product for determining the coefficients of a function representative of an input signal based on a predetermined plurality of samples of the input signal, wherein the computer program product comprises:
a computer readable storage medium having computer readable program code means embodied in said medium, said computer-readable program code means comprising:
first computer instruction means for storing in a first memory device having an array of cells pre-calculated values, wherein each coefficient is comprised of at least one term that is at least partially based upon a combination of a sample and a mathematical function, wherein each sample of the signal has a value that is one of a finite number of possible values, wherein said first computer instruction means comprises storing in the first memory device a pre-calculated value corresponding to the combination of one of the finite number of possible values of the sample and the mathematical function associated with each coefficient and sample such that each cell is associated with a respective sample, coefficient, and finite value of the sample, and wherein each sell is represented by a token address;
second computer instruction means for receiving samples of the signal;
third computer instruction means for determining the finite value of the sample; and
fourth computer instruction means for updating the coefficients of the function based on each sample, wherein said fourth computer instruction means outputs the token associated with the coefficient and the value of the sample to the first memory device, and retrieves the pre-calculated value stored in the cell of the first memory device that has an address comprised of the token and the value of the sample, and updates the coefficient by adding the pre-calculated value from the first memory device to the previous value of the coefficient.

24. A computer program product according to claim 23, wherein each token also indicates if the value of the mathematical function associated with the respective sample and coefficient is zero, and wherein said fourth computer instruction means updates the coefficient by adding a zero to the previous value of the coefficient if the token indicated that the value of the mathematical function is zero.

25. A computer program product according to claim 23, wherein each token also indicates if the sign of the mathematical function associated with the respective sample and coefficient is positive or negative, wherein said first computer instruction means stores only pre-calculated values corresponding to the combination of a respective sample and the magnitude of a respective mathematical function without accounting for the sign of the mathematical function, thereby reducing the number of pre-calculated values that are stored by the first memory device.

26. A computer program product according to claim 23, wherein each token represents a respective coefficient and sample, wherein said method further comprises fifth computer instruction means for selecting the tokens, wherein to generate coefficients representing a function that is the inverse of the signal, said fifth computer instruction means switches the contents of the token such that the token addresses a cell in the first memory device containing a pre-calculated value representing an inverse mathematical function associated with a respective sample and coefficient, and wherein said fourth computer instruction means updates the coefficient by adding the pre-calculated value from the first memory device to the previous value of the coefficient.

27. A computer program product according to claim 26, wherein said second computer instruction means receives samples one at a time from a plurality of signals each present on a separate channel, wherein said fourth computer instruction means receives each of the samples one at a time for each of the signals and based on the tokens from said fifth computer instruction means, said fourth computer instruction means updates the coefficients of the function associated with each sample based on each sample associated with the signal as the sample is received, wherein said fifth computer instruction means switches the tokens for the samples received from at least on of the channels, such that said fourth computer instruction means generates coefficients representing a function that is the inverse of the signal for at least one channel.

28. A computer program product for determining the coefficients of a function for a given input signal based on a sample of the input signal, wherein each coefficient is comprised of at least one term that is at least partially based upon a combination of the sample and a mathematical function, wherein the computer program product comprises:
a computer readable storage medium having computer readable program code means embodied in said medium, said computer-readable program code means comprising:
first computer instruction means for storing a value representing the mathematical function associated with the sample and each coefficient in a first memory device;
second computer instruction means for receiving the sample of the input signal;

third computer instruction means for determining a respective term of each coefficient by accessing the first memory device, multiplying the sample by the value representing the mathematical function associated with the sample and coefficient to thereby define a term; and fourth computer instruction means for updating each coefficient by adding the respective term to the previous value of the coefficients, wherein the sample of the input signal has a value that is one of a finite number of possible values, said first computer instruction means stores in a first memory device having an array of cells a pre-calculated value corresponding to the combination of one of the finite number of possible values of the sample and the mathematical function associated with each coefficient such that each cell contains a pre-calculated value corresponding to the combination of one of the finite number of possible values of the sample and the mathematical function associated with the respective coefficient, wherein said computer-readable program code means comprises fifth computer instruction means for storing tokens that each represent a respective coefficient and the sample in a second memory device having an array of cells, and wherein for each sample said third computer instruction means accesses the second memory device and retrieves the token associated with the coefficient and the sample and supplies the token to the first memory device, and thereafter retrieves the pre-calculated value stored in the cell of the first memory device that has an address comprised of the token and the value of the sample, and wherein said fourth computer instruction means updates the coefficient by adding the pre-calculated value from the first memory device to the previous value of the coefficient.

29. A computer program product according to claim 28, wherein each token also indicates if the value of the mathematical function associated with the respective sample and coefficient is zero, and wherein said fourth computer instruction means updates the coefficient by adding a zero to the previous value of the coefficient if the token indicated that the value of the mathematical function is zero.

30. A computer program product according to claim 28, wherein each token also indicates if the sign of the mathematical function associated with the respective sample and coefficient is positive or negative, wherein said first computer instruction means stores in the first memory device step comprises storing only pre-calculated values corresponding to the combination of a respective sample and the magnitude of a respective mathematical function without accounting for the sign of the mathematical function, thereby reducing the number of pre-calculated values that are stored by the first memory device.

* * * * *

UNITED STATES PATENT AND TRADEMARK OFFICE
CERTIFICATE OF CORRECTION

PATENT NO. : 6,735,610 B1
DATED : May 11, 2004
INVENTOR(S) : Pelton

It is certified that error appears in the above-identified patent and that said Letters Patent is hereby corrected as shown below:

Title page,
Item [56], References Cited, U.S. PATENTS DOCUMENTS, insert the following:

-- 3,803,393    4/1974   Wang
   4,868,776    9/1989   Gray et al.
   5,007,009    4/1992   Azetsu
   5,504,690    4/1996   Kageyama et al. --;

Item [56], References Cited, FOREIGN PATENT DOCUMENTS, insert the following:

-- EP   0 075 745 A2   4/1983
   EP   0 080 266 A2   6/1983
   EP   0 372 566 A2   6/1990
   EP   0 441 121 A2   8/1991 --.

Signed and Sealed this

Tenth Day of August, 2004

JON W. DUDAS
*Acting Director of the United States Patent and Trademark Office*